United States Patent
Ruedinger et al.

(10) Patent No.: US 12,106,178 B2
(45) Date of Patent: Oct. 1, 2024

(54) QUANTUM STATE MEASUREMENT LOGIC FACILITATING A QUANTUM STATE MEASUREMENT BACKEND PROCESS

(71) Applicant: International Business Machines Corporation, Armonk, NY (US)

(72) Inventors: Jeffrey Joseph Ruedinger, Rochester, MN (US); Thomas Arab Alexander, Tarrytown, NY (US); David C. Mckay, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 988 days.

(21) Appl. No.: 17/018,480

(22) Filed: Sep. 11, 2020

(65) Prior Publication Data

US 2022/0083887 A1 Mar. 17, 2022

(51) Int. Cl.
G06N 10/00 (2022.01)
G06F 8/41 (2018.01)

(52) U.S. Cl.
CPC .............. *G06N 10/00* (2019.01); *G06F 8/41* (2013.01)

(58) Field of Classification Search
CPC .......... G06N 10/00; G06N 10/80; G06F 8/41; G06F 8/60; G06F 8/451
See application file for complete search history.

(56) References Cited

U.S. PATENT DOCUMENTS

| | | | |
|---|---|---|---|
| 9,218,567 B2 | 12/2015 | Macready et al. |
| 9,645,604 B1 | 5/2017 | Nebesnyi |
| 9,876,505 B1 | 1/2018 | Dai et al. |
| 10,505,524 B1 | 12/2019 | Cohen et al. |
| 10,536,224 B1 | 1/2020 | Nation et al. |
| 10,546,244 B2 | 1/2020 | Bishop et al. |
| 10,552,756 B2 | 2/2020 | Ipek et al. |
| 10,560,076 B1 | 2/2020 | Cohen et al. |
| 10,635,990 B1 | 4/2020 | Park et al. |

(Continued)

FOREIGN PATENT DOCUMENTS

| | | |
|---|---|---|
| EP | 2729903 | 5/2014 |
| WO | 2013/006836 A1 | 1/2013 |

(Continued)

OTHER PUBLICATIONS

Appendix P: IBM Patents or Patent Applications Treated as Related.
(Continued)

*Primary Examiner* — Hope C Sheffield
(74) *Attorney, Agent, or Firm* — Amin, Turocy & Watson, LLP

(57) ABSTRACT

Systems, computer-implemented methods, and computer program products to facilitate quantum state measurement logic used in a quantum state measurement backend process are provided. According to an embodiment, a system can comprise a memory that stores computer executable components and a processor that executes the computer executable components stored in the memory. The computer executable components can comprise a stage control register component that defines a data processing function corresponding to at least one storage element in at least one stage of a quantum state measurement pipeline.

20 Claims, 12 Drawing Sheets

(56) References Cited

U.S. PATENT DOCUMENTS

| | | |
|---|---|---|
| 11,210,602 B2 | 12/2021 | Biercuk et al. |
| 2005/0015422 A1 | 1/2005 | Kohn et al. |
| 2005/0044344 A1 | 2/2005 | Stevens |
| 2013/0198740 A1 | 8/2013 | Arroyo et al. |
| 2014/0026108 A1 | 1/2014 | Bocharov et al. |
| 2015/0026494 A1 | 1/2015 | Bainbridge et al. |
| 2015/0205759 A1 | 7/2015 | Israel et al. |
| 2015/0324705 A1 | 11/2015 | Biercuk et al. |
| 2016/0218867 A1 | 7/2016 | Nordholt et al. |
| 2016/0267032 A1 | 9/2016 | Rigetti et al. |
| 2016/0328211 A1 | 11/2016 | Nordholt et al. |
| 2017/0177534 A1 | 6/2017 | Mohseni et al. |
| 2018/0276556 A1 | 9/2018 | Garrison et al. |
| 2019/0042392 A1 | 2/2019 | Matsuura et al. |
| 2019/0042965 A1 | 2/2019 | Clarke et al. |
| 2019/0042970 A1 | 2/2019 | Zou et al. |
| 2019/0042973 A1 | 2/2019 | Zou et al. |
| 2019/0251478 A1 | 8/2019 | Bishop et al. |
| 2019/0362270 A1* | 11/2019 | Haener .............. G06F 30/327 |
| 2020/0116784 A1 | 4/2020 | Liu et al. |
| 2020/0125402 A1 | 4/2020 | Griffin et al. |
| 2020/0349458 A1 | 11/2020 | Cohen et al. |
| 2020/0358536 A1 | 11/2020 | Griffin et al. |
| 2021/0042650 A1* | 2/2021 | Das ..................... G06N 10/80 |
| 2021/0279625 A1 | 9/2021 | Shani et al. |
| 2023/0145090 A1 | 5/2023 | Bishop et al. |

FOREIGN PATENT DOCUMENTS

| | | |
|---|---|---|
| WO | 2020056176 | 3/2020 |
| WO | 2020109869 | 6/2020 |

OTHER PUBLICATIONS

Reply dated Oct. 30, 2023 in response to the communication pursuant to Rules 161(1) and 162 EPC dated Apr. 20, 2023 for EP Application No. EP21773604.0.

Examination Report No. 1 received for Australian Patent Application Serial No. 2021341467 dated Jun. 13, 2023, 3 pages.

International Search Report and Written Opinion received for PCT Application Serial No. PCT/EP2021/074825 dated Dec. 2, 2021, 12 pages.

Versluis et al., "Quantum computers scale up: Constructing a universal quantum computer with a large number of qubits will be hard but not impossible", IEEE Spectrum, XP011781542, vol. 57, No. 4, Apr. 1, 2020, pp. 24-29.

Calderaro et al., "Fast and simple qubit-based synchronization for quantum key distribution", arxiv.org, Cornell University Library, 201 Olin Library Cornell University Ithaca, NY 14853, XP081483617, Sep. 26, 2019, 7 pages.

Non-Final Office Action received for U.S. Appl. No. 17/018,531 dated Jan. 21, 2022, 25 pages.

International Search Report and Written Opinion received for PCT Application Serial No. PCT/EP2021/074830 dated Jan. 14, 2022, 11 pages.

International Search Report and Written Opinion received for PCT Application Serial No. PCT/EP2021/074829 dated Dec. 22, 2021, 15 pages.

Guerreschi et al. "Two-step approach to scheduling quantum circuits", arXiv:1708.00023v2 [quant-ph], XP081150149, May 16, 2018, 25 pages.

Tarjan, Paul "Online YAML Parser" http://yaml-online-parser.appspot.com/, Last Accessed Aug. 24, 2020. 1 page.

Qiskit "Development Strategy" Qiskit Development Team,. https://qiskit.org/documentation/development_strategy.html, Last Accessed Aug. 24, 2020. 9 pages.

Ben-Kiki "YPaste—Online YAML Reference Parser" ben-kiki.org/oren/2016/02/26/ypaste.html, Last Accessed Aug. 24, 2020, 1 page.

Databytzal, "Learn YAML in five minutes!" Code Project, https://www.codeproject.com/Articles/1214409/Learn-YAML-in-five-minutes, Dec. 28, 2017. 7 pages.

"YAML 1.2" https://yaml.org/, Last Accessed, Aug. 24, 2020, 3 pages.

Yehan, Liu "Quantum Feedback Control of Multiple Superconducting Qubits" Yale University, Dec. 2016, 181 pages.

Steiger et al. "ProjectQ: An Open Source Software Framework for Quantum Computing" arXiv:1612.08091v1 [quant-ph] Dec. 23, 2016, 11 pages.

Mell, Peter, et al. "The NIST Definition of Cloud Computing." National Institute of Standards and Technology. Sep. 2011. 7 pages.

McKay et al., "Qiskit Backend Specifications for OpenQASM and OpenPulse Experiments," arXiv:1809.03452 [quant-ph, Sep. 11, 2018, 68 pages.

Alexander et al., "Qiskit Pulse: Programming Quantum Computers through the Clouds with Pulses," arXiv:2004.06755 [quant-ph], Apr. 14, 2020, 16 pages.

McClure, "Programming Quantum Computers with Qiskit," WiSQCE, Jan. 2020, 49 pages.

Non Final Office Action received for U.S. Appl. No. 17/018,507, dated Dec. 29, 2023, 70 pages.

Ryan et al., "Hardware for Dynamic Quantum Computing", Review of Scientific, AIP Publishing, vol. 88, No. 104703, Oct. 19, 2017, 22 pages.

Final Office Action for U.S. Appl. No. 17/018,507 dated Jul. 30, 2024.

* cited by examiner

Memory layout for Level 0, 1, 2 e.g. memory_slots = 4

Level 0 — memory_slot_size = 3

| memory_slot | | | | | | |
|---|---|---|---|---|---|---|
| [0] | 0.12 | -0.11 | 1.324 | -0.103 | 6.73 | 8.94 |
| [1] | -10.12 | 3.11 | 6.93 | 7.75 | -4.31 | 8.33 |
| [2] | 4.154 | 0.094 | 16.53 | -11.99 | 0.01 | -0.11 |
| [3] | 2.534 | 2.543 | 1.002 | 0.67 | -5.12 | 10.44 |
| | Real | Imaginary | Real | Imaginary | Real | Imaginary |
| | Sample 1 | | Sample 2 | | Sample 3 | |

⇔ dtm ⇔ dtm

Level 1

| memory_slot | I | Q |
|---|---|---|
| [0] | 0.12 | -0.11 |
| [1] | 1.41 | 0.133 |
| [2] | -1.553 | 1.423 |
| [3] | 10.01 | -15.11 |
| | Real | Imaginary |

Level 2

| memory_slot | Qvalue |
|---|---|
| [0] | 0 |
| [1] | 1 |
| [2] | 1 |
| [3] | 0 |
| | Binary |

FIG. 3

QUANTUM STATE MEASUREMENT LOGIC FACILITATING A QUANTUM STATE MEASUREMENT BACKEND PROCESS

BACKGROUND

The subject disclosure relates to a quantum state measurement process, and more specifically, to quantum state measurement logic facilitating a quantum state measurement backend process.

Some existing quantum state measurement backend technologies define various layers of measurements associated with capturing a quantum state of a quantum bit (qubit). For example, some existing quantum state measurement backend technologies define 3 layers of measurements for a qubit state: Level 0 is raw data, which is a filtered version of the individual samples that are captured from an analog-to-digital converter (ADC) device: Level 1 resolves the raw data through a kernel into a single pair of complex numbers (e.g., an in-phase (I) vector and a quadrature-phase (Q) vector); and Level 2 further resolves it to a single binary bit through a discriminator.

Some existing quantum state measurement backend technologies allow an entity (e.g., a user) to specify which level, kernel, and discriminator to apply to each qubit measurement. A problem with such existing quantum state measurement backend technologies is that it is challenging to apply this amount of flexibility to one or more quantum backend computing resources, or to apply this amount of flexibility to different instances of quantum state measurement logic in a single quantum backend computing resource. Such challenges arise because implementations of different quantum backend computing resources may dramatically differ in their capture capabilities, quantity of samples they can capture, and flexibility in selecting different kernels and discriminators to apply to the data. In addition, some existing quantum measurement backend technologies use a compiler to map and schedule an entity's test criteria (e.g., user test criteria) onto instances of measurement logic in a quantum backend computing resource. Given the challenges described above, a problem with such existing quantum state measurement backend technologies is that they involve implementation of a unique compiler for each measurement instance.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate quantum state measurement logic used in a quantum state measurement backend process are described.

According to an embodiment, a system can comprise a memory that stores computer executable components and a processor that executes the computer executable components stored in the memory. The computer executable components can comprise a stage control register component that defines a data processing function corresponding to at least one storage element in at least one stage of a quantum state measurement pipeline. An advantage of such a system is that it can enable a quantum state measurement backend system to more quickly and more efficiently identify a greater quantity of quantum backend computing resources that can capture a quantum state measurement based on one or more entity defined criteria.

In some embodiments, the stage control register component defines the data processing function based on one or more entity defined criteria corresponding to the quantum state measurement pipeline and the stage control register component defines data processing functions corresponding to storage elements in the at least one stage of the quantum state measurement pipeline to enable a defined quantity of quantum backend computing resources to capture a quantum state measurement based on quantum state measurement logic comprising the data processing functions. An advantage of such a system is that it can enable a quantum state measurement backend system to more quickly and more efficiently identify a greater quantity of quantum backend computing resources that can capture a quantum state measurement based on one or more entity defined criteria.

According to another embodiment, a computer-implemented method can comprise defining, by a system operatively coupled to a processor, a data processing function corresponding to at least one storage element in at least one stage of a quantum state measurement pipeline. An advantage of such a computer-implemented method is that it can be implemented to enable a quantum state measurement backend system to more quickly and more efficiently identify a greater quantity of quantum backend computing resources that can capture a quantum state measurement based on one or more entity defined criteria.

In some embodiments, the above computer-implemented method can further comprise defining, by the system, the data processing function based on one or more entity defined criteria corresponding to the quantum state measurement pipeline; and defining, by the system, data processing functions corresponding to storage elements in the at least one stage of the quantum state measurement pipeline to enable a defined quantity of quantum backend computing resources to capture a quantum state measurement based on quantum state measurement logic comprising the data processing functions. An advantage of such a computer-implemented method is that it can be implemented to enable a quantum state measurement backend system to more quickly and more efficiently identify a greater quantity of quantum backend computing resources that can capture a quantum state measurement based on one or more entity defined criteria.

According to another embodiment, a computer program product facilitating a quantum state measurement backend process is provided. The computer program product comprising a computer readable storage medium having program instructions embodied therewith, the program instructions executable by a processor to cause the processor to define, by the processor, a data processing function corresponding to at least one storage element in at least one stage of a quantum state measurement pipeline. An advantage of such a computer program product is that it can enable a quantum state measurement backend system to more quickly and more efficiently identify a greater quantity of quantum backend computing resources that can capture a quantum state measurement based on one or more entity defined criteria.

In some embodiments, the program instructions are further executable by the processor to cause the processor to generate, by the processor, quantum state measurement logic based on data processing functions corresponding to storage elements in the at least one stage of the quantum state measurement pipeline; and identify, by the processor, one or more quantum backend computing resources having ability to capture a quantum state measurement based on the quantum state measurement logic. An advantage of such a computer program product is that it can enable a quantum state measurement backend system to more quickly and more efficiently identify a greater quantity of quantum backend computing resources that can capture a quantum state measurement based on one or more entity defined criteria.

DESCRIPTION OF THE DRAWINGS

FIG. 3 illustrates an example, non-limiting diagram that can facilitate quantum state measurement logic used in a quantum state measurement backend process in accordance with one or more embodiments described herein.

DETAILED DESCRIPTION

Figure 1:
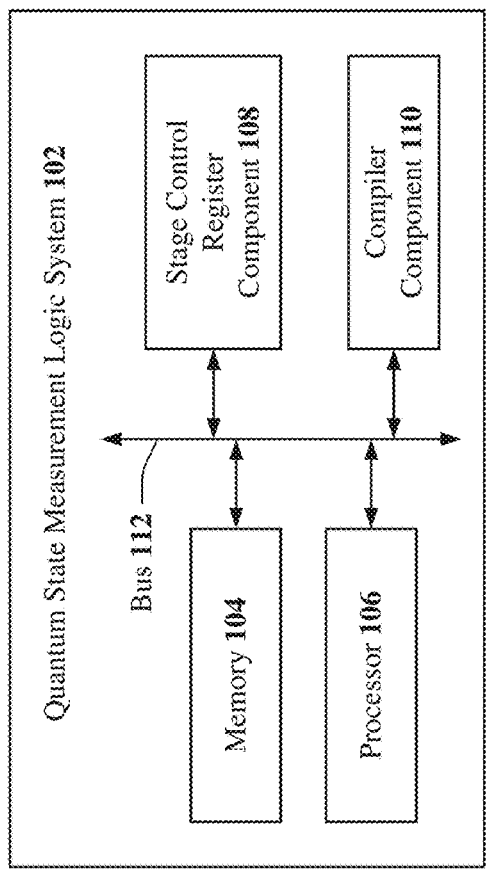
FIG. 1 illustrates a block diagram of an example, non-limiting system that can facilitate quantum state measurement logic used in a quantum state measurement backend process in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Given the problems described above with some existing quantum state measurement backend technologies, the present disclosure can be implemented to produce a solution to these problems in the form of systems, computer-implemented methods, and/or computer program products that can define a data processing function corresponding to at least one storage element in at least one stage of a quantum state measurement pipeline. An advantage of such systems, computer-implemented methods, and/or computer program products is that they can be implemented to enable a quantum state measurement backend system to more quickly and more efficiently identify a greater quantity of quantum backend computing resources that can capture a quantum state measurement based on one or more entity defined criteria.

In some embodiments, the present disclosure can be implemented to produce a solution to the problems described above in the form of systems, computer-implemented methods, and/or computer program products that can define the data processing function based on one or more entity defined criteria corresponding to the quantum state measurement pipeline; and/or define data processing functions corresponding to storage elements in the at least one stage of the quantum state measurement pipeline to enable a defined quantity of quantum backend computing resources to capture a quantum state measurement based on quantum state measurement logic comprising the data processing functions. An advantage of such systems, computer-implemented methods, and/or computer program products is that they can be implemented to enable a quantum state measurement backend system to more quickly and more efficiently identify a greater quantity of quantum backend computing resources that can capture a quantum state measurement based on one or more entity defined criteria.

It will be understood that when an element is referred to herein as being "coupled" to another element, it can describe one or more different types of coupling. For example, when an element is referred to herein as being "coupled" to another element, it can described one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling.

As referenced herein, an entity can comprise a human, a client, a user, a computing device, a software application, an agent, a machine learning model, an artificial intelligence, and/or another entity. It should be appreciated that such an entity can implement one or more embodiments of the subject disclosure described herein.

FIG. 1 illustrates a block diagram of an example, non-limiting system 100 that can facilitate quantum state measurement logic used in a quantum state measurement backend process in accordance with one or more embodiments described herein. System 100 can comprise a quantum state measurement logic system 102, which can be associated with a cloud computing environment. For example, quantum state measurement logic system 102 can be associated with cloud computing environment 1150 described below with reference to FIG. 11 and/or one or more functional abstraction layers described below with reference to FIG. 12 (e.g., hardware and software layer 1260, virtualization layer 1270, management layer 1280, and/or workloads layer 1290).

Quantum state measurement logic system 102 and/or components thereof (e.g., stage control register component 108, compiler component 110, etc.) can employ one or more computing resources of cloud computing environment 1150 described below with reference to FIG. 11 and/or one or more functional abstraction layers (e.g., quantum software, etc.) described below with reference to FIG. 12 to execute one or more operations in accordance with one or more embodiments of the subject disclosure described herein. For example, cloud computing environment 1150 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by quantum state measurement logic system 102 and/or components thereof to execute one or more operations in accordance with one or more embodiments of the subject disclosure described herein. For instance, quantum state measurement logic system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As illustrated in the example embodiment depicted in FIG. 1, quantum state measurement logic system 102 can comprise a memory 104, a processor 106, a stage control register component 108, a compiler component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or quantum state measurement logic system 102 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 and/or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum state measurement logic system 102, stage control register component 108, compiler component 110, and/or another component associated with quantum state measurement logic system 102 as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 1014 and FIG. 10. Such examples of processor 106 can be employed to implement any embodiments of the subject disclosure.

Quantum state measurement logic system 102, memory 104, processor 106, stage control register component 108, compiler component 110, and/or another component of quantum state measurement logic system 102 as described herein can be communicatively, electrically, operatively, and/or optically coupled to one another via a bus 112 to perform functions of system 100, quantum state measurement logic system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 1018 and FIG. 10. Such examples of bus 112 can be employed to implement any embodiments of the subject disclosure.

Quantum state measurement logic system 102 can comprise any type of component, machine, device, facility, apparatus, and/or instrument that comprises a processor and/or can be capable of effective and/or operative communication with a wired and/or wireless network. All such embodiments are envisioned. For example, quantum state measurement logic system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Quantum state measurement logic system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, quantum state measurement logic system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, quantum state measurement logic system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, quantum state measurement logic system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between quantum state measurement logic system 102 and external systems, sources, and/or devices (e.g., computing devices, communication devices, etc.).

Quantum state measurement logic system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with quantum state measurement logic system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, stage control register component 108, compiler component 110, and/or any other components associated with quantum state measurement logic system 102 as disclosed herein (e.g., communicatively, electronically, operatively, and/or optically coupled with and/or employed by quantum state measurement logic system 102), can comprise such computer and/or machine readable, writable, and/or executable component(s) and/or instruction(s). Consequently, according to numerous embodiments, quantum state measurement logic system 102 and/or any components associated therewith as disclosed herein, can employ processor 106 to execute such computer and/or machine readable, writable, and/or executable component(s) and/or instruction(s) to facilitate performance of one or more operations described herein with reference to quantum state measurement logic system 102 and/or any such components associated therewith.

Quantum state measurement logic system 102 can facilitate (e.g., via processor 106) performance of operations executed by and/or associated with one or more components thereof (e.g., stage control register component 108, compiler component 110, etc.). For example, quantum state measurement logic system 102 can facilitate (e.g., via processor 106): defining a data processing function corresponding to at least one storage element in at least one stage of a quantum state measurement pipeline.

In another example, as described in detail below, quantum state measurement logic system 102 can further facilitate (e.g., via processor 106): generating quantum state measurement logic based on data processing functions corresponding to storage elements in the at least one stage of the quantum state measurement pipeline; identifying one or more quantum backend computing resources having ability to capture a quantum state measurement based on the quantum state measurement logic; defining the data processing function based on one or more entity defined criteria corresponding to the quantum state measurement pipeline; defining data processing functions corresponding to storage elements in the at least one stage of the quantum state measurement pipeline to enable a defined quantity of quantum backend computing resources to capture a quantum state measurement based on quantum state measurement logic comprising the data processing functions; and/or generating quantum state measurement logic based on a first set of data processing functions or a second set of data processing functions, wherein the first set of data processing functions comprises a reuse function corresponding to a single storage element in a bit stage of the quantum state measurement pipeline and the second set of data processing functions comprises an archive function corresponding to all storage elements in the bit stage, thereby facilitating reduced computational costs associated with one or more quantum backend computing resources that capture a quantum state measurement based on the quantum state measurement logic. In the above examples: the data processing function can comprise an archive function indicative of preserving a current quantum measurement result or a reuse function indicative of overlaying a current quantum measurement result with a subsequent quantum measurement result; and/or the at least one stage can comprise a capture array stage, a kernel stage, a vector pair value stage, a discriminator stage, and/or a bit stage.

Stage control register component 108 can define a data processing function corresponding to at least one storage element in at least one stage of a quantum state measurement pipeline. For example, stage control register component 108 can define a data processing function that can include, but is not limited to, an archive function indicative of preserving a current quantum measurement result, a reuse function indicative of overlaying a current quantum measurement result with a subsequent quantum measurement result, and/or another data processing function. Stage control register component 108 can define such a data processing function corresponding to at least one storage element in at least one stage of a quantum state measurement pipeline, where such at least one stage can include, but is not limited to, a capture array stage, a kernel stage, a vector pair value stage, a discriminator stage, a bit stage, and/or another stage of a quantum state measurement pipeline.

To define a data processing function corresponding to at least one storage element in at least one stage of a quantum state measurement pipeline, stage control register component 108 can generate one or more stage control registers that can each correspond to a certain stage of the quantum state measurement pipeline. In various embodiments, each of such one or more stage control registers can comprise at least one data processing function corresponding to at least one storage element in such a certain stage of the quantum state measurement pipeline. It should be appreciated that generation by stage control register component 108 of such one or more stage control registers described above can constitute defining a data processing function corresponding to at least one storage element in at least one stage of a quantum state measurement pipeline.

In some embodiments, stage control register component 108 can define multiple data processing functions that respectively correspond to multiple storage elements in at least one stage of a quantum state measurement pipeline. For example, stage control register component 108 can generate multiple stage control registers that respectively correspond to multiple stages of a quantum state measurement pipeline. In this example, each of such stage control registers can comprise multiple storage elements, where at least two of such multiple storage elements can have a data processing function associated therewith.

In the above example, it should be appreciated that stage control register component 108 can define multiple data processing functions that respectively correspond to multiple storage elements in at least one stage of the quantum state measurement pipeline to enable a defined quantity of quantum backend computing resources to capture a quantum state measurement based on quantum state measurement logic comprising the data processing functions. For example, it should be appreciated that stage control register component 108 can define multiple data processing functions that respectively correspond to multiple storage elements in at least one stage of the quantum state measurement pipeline to enable a greater quantity of quantum backend computing resources to capture a quantum state measurement based on quantum state measurement logic comprising the data processing functions (e.g., a greater quantity when compared to a certain quantity of quantum backend computing resources that can capture a quantum state measurement without using such quantum state measurement logic comprising the data processing functions).

Stage control register component 108 can define a data processing function based on one or more entity defined criteria corresponding to the quantum state measurement pipeline. For example, although not depicted in the figures, in some embodiments, quantum state measurement logic system 102 can comprise an interface component (e.g., a graphical user interface (GUI), an application programming interface (API), etc.) that an entity as defined herein can use to input one or more criteria corresponding to the quantum state measurement pipeline. For instance, such an entity can use such an interface component of quantum state measurement logic system 102 to: define the number of storage elements in each stage of the quantum state measurement pipeline; define a certain kernel to be used in a kernel stage of the quantum state measurement pipeline; define a certain discriminator to be used in a discriminator stage of the quantum state measurement pipeline; define one or more types of data processing functions (e.g., an archive function, a reuse function, etc.) that can be defined for one or more storage elements in at least one stage of the quantum state measurement pipeline; define a certain data processing function (e.g., an archive function, a reuse function, etc.) for one or more storage elements in at least one stage of the quantum state measurement pipeline; define one or more memory slots to store one or more binary values output by the quantum state measurement pipeline; and/or define another criterion corresponding to the quantum state measurement pipeline. In this example, stage control register component 108 can generate one or more of the above described stage control registers based on such one or more entity defined criteria, where each of such one or more stage control registers can correspond to a certain stage of the quantum state measurement pipeline.

Compiler component 110 can generate quantum state measurement logic based on data processing functions corresponding to storage elements in at least one stage of a quantum state measurement pipeline. For example, compiler component 110 can generate quantum state measurement logic based on (e.g., using) the data processing functions that can be defined by stage control register component 108 as described above, where such data processing functions correspond to storage elements in at least one stage of a quantum state measurement pipeline. For instance, compiler component 110 can generate quantum state measurement logic comprising the above described one or more stage control registers that can be generated by stage control register component 108, where each state control register can correspond to a certain stage of a quantum state measurement pipeline and each state control register can comprise at least one data processing function corresponding to at least one storage element in the stage.

Compiler component 110 can identify one or more quantum backend computing resources having ability to capture a quantum state measurement based on the above described quantum state measurement logic that can be generated by compiler component 110. For example, compiler component 110 can identify one or more quantum backend computing resources having ability to capture a quantum state measurement based on (e.g., using) quantum state measurement logic that can be generated by compiler component 110 based on (e.g., using) the data processing functions that can be defined by stage control register component 108 as described above. In various embodiments, such one or more quantum backend computing resources can include, but are not limited to, quantum based software, quantum hardware (e.g., quantum processor, superconducting circuit, etc.), a quantum device (e.g., a quantum computer, etc.), and/or another quantum backend computing resource. In these embodiments, such one or more quantum backend computing resources can capture a quantum state measurement of one or more qubits based on (e.g., using) quantum state measurement logic that can be generated by compiler component 110 as described above.

In an embodiment, compiler component 110 can generate quantum state measurement logic based on a first set of data processing functions or a second set of data processing functions. In this embodiment, the first set of data processing functions comprises a reuse function corresponding to a single storage element in a bit stage of a quantum state measurement pipeline and the second set of data processing functions comprises an archive function corresponding to all storage elements in such a bit stage. In this embodiment, stage control register component 108 can define such a first set of data processing functions and/or such a second set of data processing functions as described above. It should be appreciated that generation of such quantum state measurement logic based on (e.g., using) the above described first set of data processing functions or second set of data processing functions can thereby facilitate reduced computational costs associated with one or more quantum backend computing resources that capture a quantum state measurement based on the quantum state measurement logic.

Figure 2:
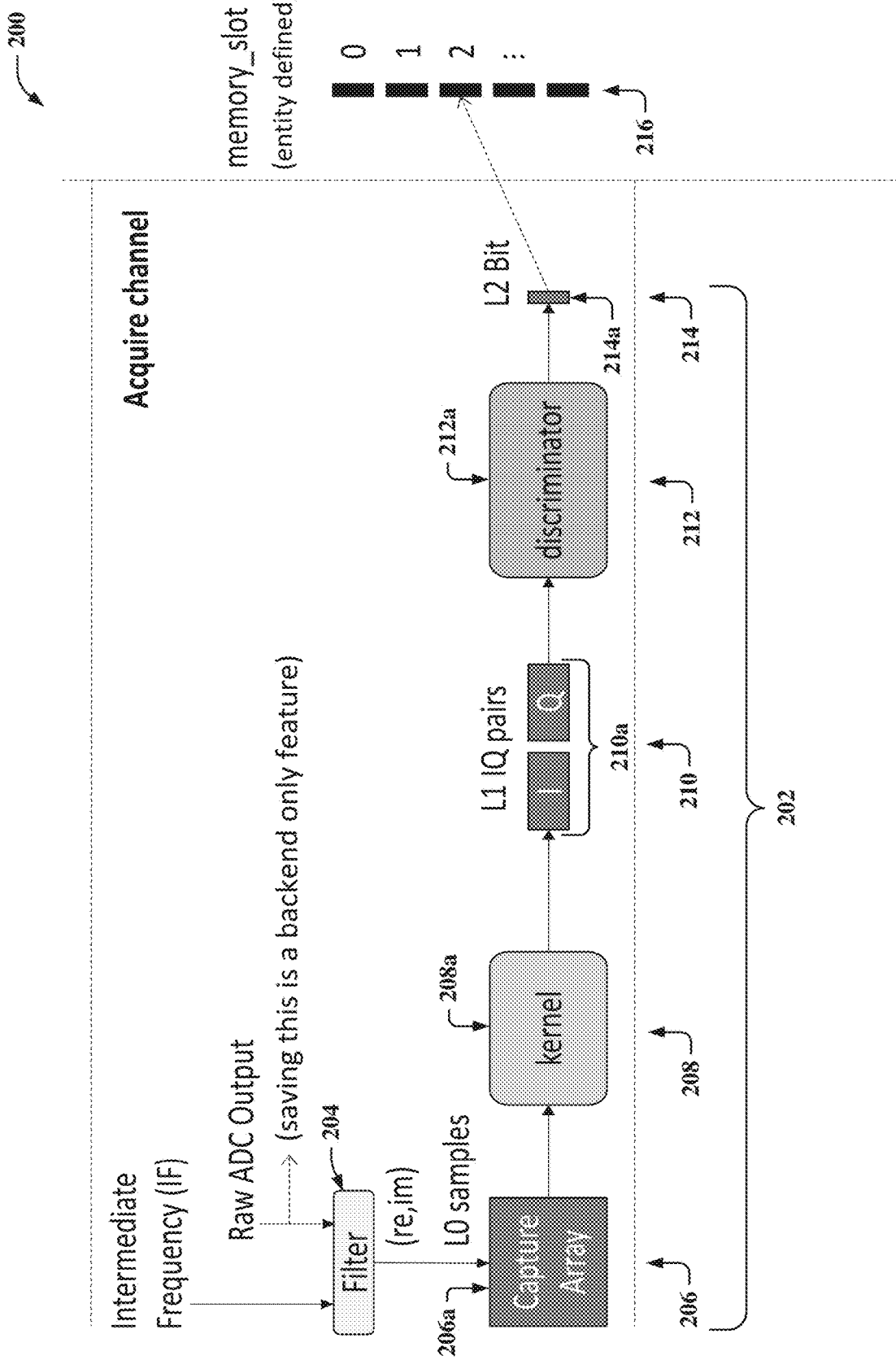
FIG. 2 illustrates a block diagram of an example, non-limiting system that can facilitate quantum state measurement logic used in a quantum state measurement backend process in accordance with one or more embodiments described herein.

FIG. 2 illustrates a block diagram of an example, non-limiting system 200 that can facilitate quantum state measurement logic used in a quantum state measurement backend process in accordance with one or more embodiments described herein. Repetitive description of like elements and/or processes employed in respective embodiments is omitted for sake of brevity.

System 200 can comprise an architecture of a quantum state measurement backend system that can facilitate a backend process of capturing a quantum state of one or more qubits. In some embodiments, system 200 can comprise an Acquire channel in a quantum state measurement backend system that can facilitate a backend process of capturing a quantum state of one or more qubits System 200 can comprise a quantum state measurement pipeline 202. Quantum state measurement pipeline 202 can comprise a capture array stage 206, a kernel stage 208, a vector pair value stage 210, a discriminator stage 212, and/or a bit stage 214. As illustrated in the example embodiment depicted in FIG. 2: capture array stage 206 can comprise a capture array storage element 206a; kernel stage 208 can comprise a kernel instance 208a; vector pair value stage 210 can comprise a vector pair value storage element 210a; discriminator stage 212 can comprise a discriminator instance 212a; and/or bit stage 214 can comprise a bit storage element 214a.

System 200 can further comprise a filter 204 that can receive raw data (e.g., voltage values) output by an analog-to-digital converter (ADC), where such raw data can comprise an intermediate frequency (IF) that can be removed by filter 204 to yield a "Level 0" data sample (referred to herein and denoted as "L0 samples" in FIG. 2) that can comprise a complex number represented by a (real, imaginary) pair of numbers (denoted as "(re,im)" in FIG. 2). In various embodiments, the L0 sample output by filter 204 can be input to quantum state measurement pipeline 202 (e.g., input to capture array stage 206 and/or capture array storage element 206a) for further processing by the various stages of quantum state measurement pipeline 202 as described below.

Figure 4:
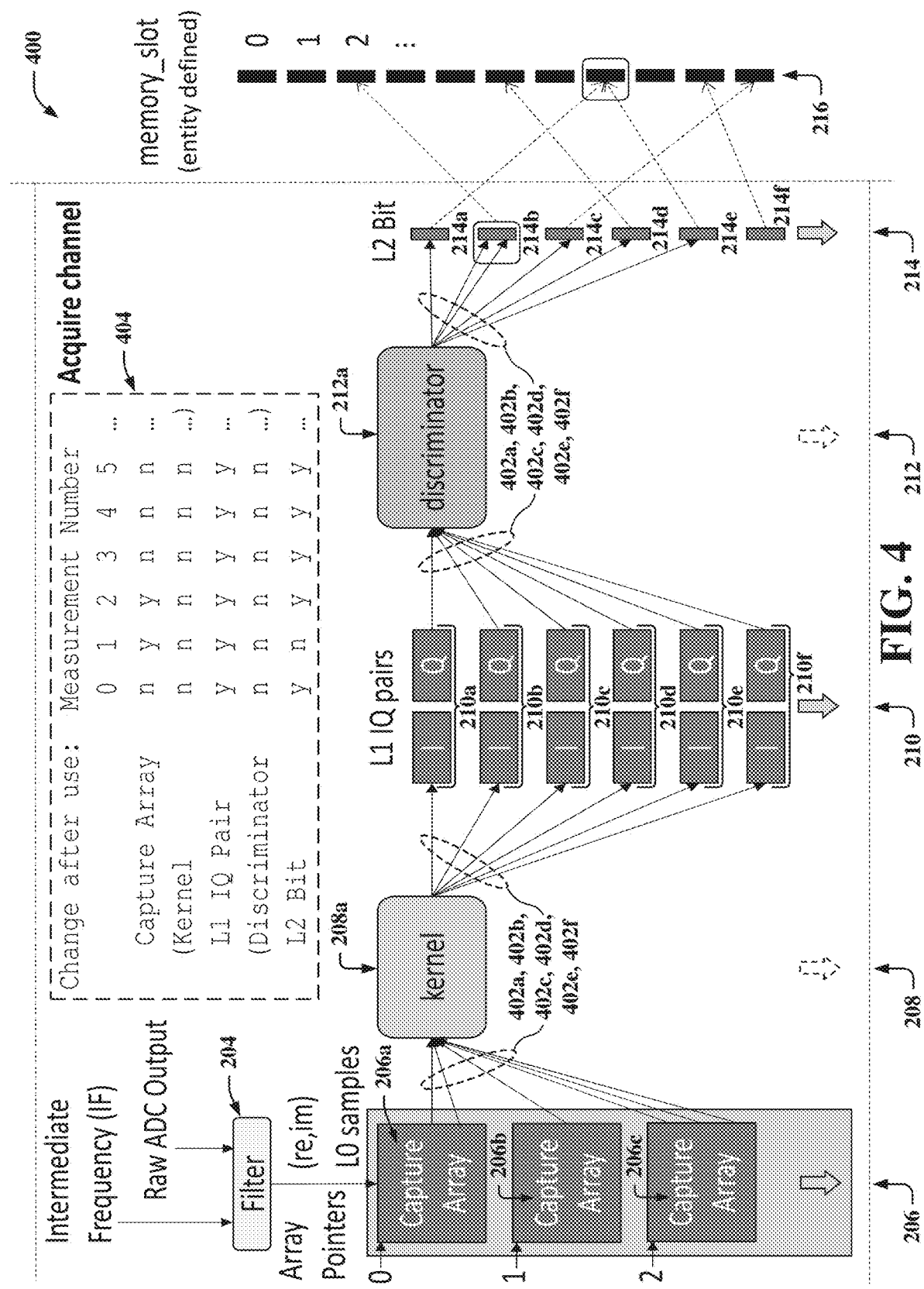
FIGS. 4, 5, and 6 illustrate block diagrams of example, non-limiting systems that can facilitate quantum state measurement logic used in a quantum state measurement backend process in accordance with one or more embodiments described herein.
Figure 5:
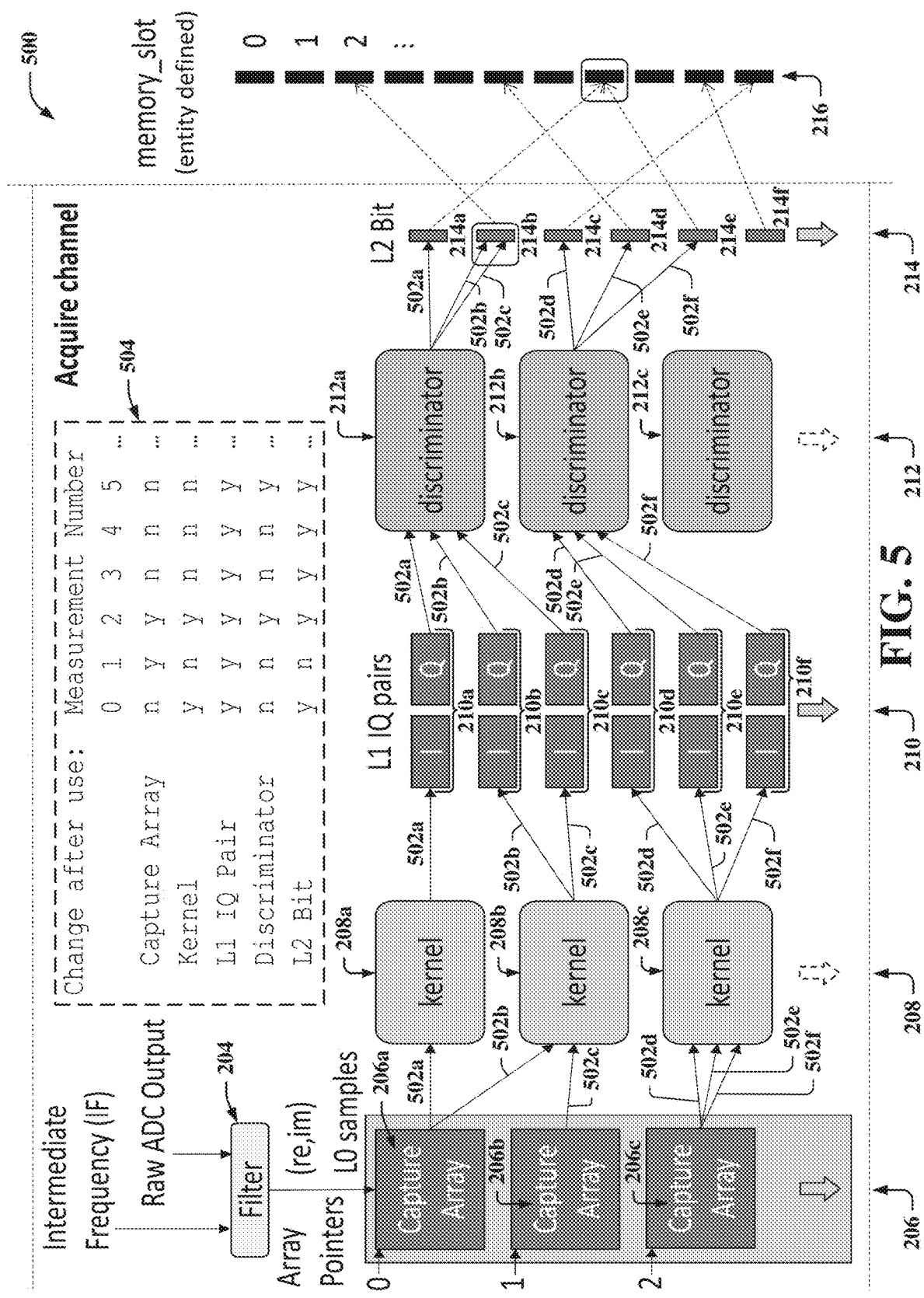

Although each stage of quantum state measurement pipeline 202 illustrated in the example embodiment depicted in FIG. 2 comprises only a single component (e.g., a single capture array storage element 206a, a single kernel instance 208a, a single vector pair value storage element 210a, a single discriminator instance 212a, and a single bit storage element 214a), it should be appreciated that the subject disclosure is not so limiting. For example, as described below with reference to FIGS. 4 and 5, each stage of quantum state measurement pipeline 202 can comprise multiples of such components (e.g., multiple capture array storage elements, multiple kernel instances, multiple vector pair value storage elements, multiple discriminator instances, and multiple bit storage elements). The example embodiment depicted in FIG. 2 illustrates how the first storage element and/or first instance of each stage of quantum state measurement pipeline 202 can be automatically selected by quantum state measurement logic system 102 to store and/or process the initial measurement data captured at the start of a qubit measurement. The example embodiments described below and depicted in FIGS. 4 and 5 illustrate how subsequent storage elements and/or subsequent instances of each stage of quantum state measurement pipeline 202 can be used by quantum state measurement logic system 102 to store and/or process subsequent measurement data captured from one or more qubits.

As illustrated in the example embodiment depicted in FIG. 2, at the start of a measurement of a qubit, the initial L0 sample output by filter 204 can be provided to capture array stage 206 and/or loaded into capture array storage element 206a. In various embodiments, such an L0 sample can comprise a complex numbers that describe the envelope of the signal coming from the qubit during measurement. In these embodiments, the L0 sample value may not be a raw voltage value out of an ADC as data at this level could still contain an intermediate frequency. Therefore, in these embodiments and as described above, filter 204 can remove any intermediate frequency, after which each data sample is a complex number represented by a (real, imaginary) pair of numbers. While filtered, in these embodiments, the complex number is still a data sample taken at a moment in time. In some embodiments, to describe the returned waveform, a series of data samples can be used, where an attribute "dtm" defines the time elapsed between data samples.

In the example embodiment illustrated in FIG. 2, kernel instance 208a of kernel stage 208 can comprise a model, an algorithm, and/or a mathematical function that can convert the L0 sample stored in capture array storage element 206a into two complex numbers called an "IQ Pair" and referred to herein as a "Level 1" data sample and/or an "L1 sample" (denoted as "L1 IQ pairs" in FIG. 2). In this example embodiment, such an L1 sample can be stored in vector pair value storage element 210a as illustrated in FIG. 2. In various embodiments, by passing the L0 sample through kernel instance 208a of kernel stage 208, the waveform can be reduced to two values, an in-phase (I) value and a quadrature phase (Q) value that, together, can constitute the L1 sample. In these embodiments, the L1 sample can represent a weighted sum of the L0 samples. In some embodiments, kernel stage 208 can comprise different kernels that can each produce different weights, but the end goal is to create I and Q values that are distinctly different when the qubit measures in the |0> quantum state versus the |1> quantum state. In some embodiments, weighting can also be used by quantum state measurement logic system 102 to ignore samples taken while waiting for the qubit to send useful information at the start and/or end of a measurement interval.

As illustrated in the example embodiment depicted in FIG. 2, the L1 samples that can be stored in vector pair value storage element 210a can be provided to discriminator instance 212a of discriminator stage 212. In various embodiments, discriminator instance 212a can comprise a model, an algorithm, and/or a mathematical function that can reduce the L1 sample (e.g., the I and Q values) of the qubit measurement to a single binary value of 0 or 1, referred to herein as a "Level 2" data sample and/or an "L2 sample" (denoted as "L2 Bit" in FIG. 2). In these embodiments, such an L2 sample (e.g., binary values of 0 or 1), can be the most condensed form of measurement results. In these embodiments, as the L2 sample can be a single bit, it can be passed around, combined with other L2 samples, and/or reduced to a single, testable binary condition.

System 200 can further comprise one or more memory slots 216 (denoted as "memory_slot" in FIG. 2) that can correspond to one or more qubits being measured or a certain qubit that is being measured multiple times (e.g., in a test performed by an entity as defined herein that implements quantum state measurement logic system 102 to perform the test). In the example embodiment depicted in FIG. 2, each memory slot 216 can be used by quantum state measurement logic system 102 to provide measurement data for a certain qubit that is output by quantum state measurement pipeline 202 to an entity as defined herein that can implement quantum state measurement logic system 102. As illustrated in the example embodiment depicted in FIG. 2, a certain memory slot 216 denoted as "2" in FIG. 2 can be used by quantum state measurement logic system 102 to provide the L2 sample value (e.g., an L2 bit value of 0 or 1) that can be stored in bit storage element 214a to an entity as defined herein that can implement quantum state measurement logic system 102. In some embodiments, such one or more memory slots 216 can be defined by such an entity that can implement quantum state measurement logic system 102. For example, such an entity can use an interface component of quantum state measurement logic system 102 (e.g., a GUI, an API, etc.) to designate a certain memory slot 216 to store L2 sample values (e.g., binary values) output by quantum state measurement pipeline 202 (e.g., output by bit storage element 214a of bit stage 214 in quantum state measurement pipeline 202).

In some embodiments, one or more memory slots 216 depicted in FIG. 2 can be used by quantum state measurement logic system 102 to provide the L0 sample(s), the L1 sample(s), and/or the L2 sample(s) to an entity as defined herein that can implement quantum state measurement logic system 102. The example embodiment described below and depicted in FIG. 3 illustrates how such different types of data (e.g., the L0, L1, and/or L2 samples) can be stored in one or more memory slots 216.

FIG. 3 illustrates an example, non-limiting diagram 300 that can facilitate quantum state measurement logic used in a quantum state measurement backend process in accordance with one or more embodiments described herein.

Repetitive description of like elements and/or processes employed in respective embodiments is omitted for sake of brevity.

Diagram 300 can comprise a memory layout corresponding to the above described L0, L1, and/or L2 samples that illustrates how such different types of data can be stored in one or more memory slots 216 and/or provided to an entity as defined herein that can implement quantum state measurement logic system 102. Currently, quantum backend hardware of existing quantum state measurement backend systems does not preserve measurement data across experiments but a host can preserve measurement data across experiments and provide such data to an entity implementing such systems. Diagram 300 shown in the example embodiment depicted in FIG. 3 illustrates how quantum state measurement logic system 102 can store and/or provide such information via one or more memory slots 216 to an entity as defined herein that can implement quantum state measurement logic system 102. In this example embodiment, diagram 300 further illustrates how the L0, L1, and/or L2 sample information can be presented to such an entity that can implement quantum state measurement logic system 102 (e.g., as real and imaginary floating point values, binary values, etc.).

In the example embodiment depicted in FIG. 3, four measurements (denoted as "[0]," "[1]," "[2]," and "[3]" in FIG. 3) can be performed by one or more quantum backend computing resources to capture three L0 samples (denoted as "Sample 1," "Sample 2," and "Sample 3" in FIG. 3). In this example embodiment, each L0 sample captured in each measurement can comprise a real and an imaginary value that can be expressed as floating point values as illustrated in FIG. 3. In this example embodiment, the attribute "dtm" defines the time elapsed between the data samples (e.g., the time elapsed between Sample 1 and Sample 2 and the time elapsed between Sample 2 and Sample 3). In this example embodiment, the L0 samples captured in each of the four measurements can be averaged (e.g., using a weighted average technique) by, for instance, kernel instance 208a of kernel stage 208 as described above with reference to FIG. 1 to yield a corresponding L1 sample for each of the four measurements. In this example embodiment, the L1 samples can also comprise a real and an imaginary value that can be expressed as floating point values as illustrated in FIG. 3. In this example embodiment, the L1 samples of each of the four measurements can be reduced by, for instance, discriminator instance 212a of discriminator stage 212 as described above with reference to FIG. 1 down to yield a binary value of 0 or 1 (denoted as "Qvalue" and "Binary" in FIG. 3).

FIG. 4 illustrates a block diagram of an example, non-limiting system 400 that can facilitate quantum state measurement logic used in a quantum state measurement backend process in accordance with one or more embodiments described herein. Repetitive description of like elements and/or processes employed in respective embodiments is omitted for sake of brevity.

System 400 can comprise an example, non-limiting alternative embodiment of system 200 described above with reference to FIG. 2. As illustrated in the example embodiment depicted in FIG. 4, capture array stage 206, vector pair value stage 210, and/or bit stage 214 can each comprise multiple storage elements that can be used in combination with kernel instance 208a and discriminator instance 212a to create multiple quantum state measurement pipelines 402a, 402b, 402c, 402d, 402e, 402f. For instance, in the example embodiment illustrated in FIG. 4: capture array stage 206 can comprise capture array storage elements 206a, 206b, 206c; vector pair value stage 210 can comprise vector pair value storage elements 210a, 210b, 210c, 210d, 210e, 210f; and/or bit stage 214 can comprise bit storage element 214a, 214b, 214c, 214d, 214e, 214f. In this example embodiment quantum state measurement pipeline 402a can comprise the same structure and/or functionality as that of quantum state measurement pipeline 202 described above with reference to FIG. 2.

In the example embodiment illustrated in FIG. 4, quantum state measurement pipelines 402a, 402b, 402c, 402d, 402e, 402f can be generated by quantum state measurement logic system 102 using stage control register component 108. For instance, in this example embodiment, stage control register component 108 can generate multiple stage control registers (e.g., 5) that respectively correspond to capture array stage 206, kernel stage 208, vector pair value stage 210, discriminator stage 212, and bit stage 214. In this example embodiment, as described in detail below, stage control register component 108 can generate such stage control registers such that they respectively define a data processing function that corresponds to at least one instance or storage element in each of such stages. For instance, stage control register component 108 can generate such stage control registers such that they respectively define an archive function or a reuse function that corresponds to at least one instance or storage element in each of such stages. In this example, such an archive function can be indicative of preserving a current quantum measurement result and such a reuse function can be indicative of overlaying a current quantum measurement result with a subsequent quantum measurement result. For instance, at the start of an experiment, the first instance or first storage element of each stage can be used by default to process or store quantum state measurement data. In this example embodiment, as each measurement is taken, the bits of each stage control register generated by stage control register component 108 can determine whether to switch to the next instance or storage element in the stage or reuse the current instance or storage element after the measurement is complete (e.g., use the current instance or storage element to process or store subsequent quantum state measurement data captured in a subsequent measurement).

As illustrated in the example embodiment depicted in FIG. 4, stage control register component 108 can generate a stage control register for capture array stage 206 such that: capture array storage element 206a is used to store a first L0 sample and is reused to store a second L0 sample; capture array storage element 206b archives a third L0 sample; and capture array storage element 206c is used to store a fourth L0 sample and is reused to store a fifth and a sixth L0 sample. In this example embodiment, stage control register component 108 can generate a stage control register for kernel stage 208 such that kernel instance 208a is used to convert the first L0 sample to a first L1 sample and is reused to convert the second, third, fourth, fifth, and sixth L0 samples to second, third, fourth, fifth, and sixth L1 samples, respectively. In this example embodiment, stage control register component 108 can generate a stage control register for vector pair value stage 210 such that vector pair value storage elements 210a, 210b, 210c, 210d, 210e, 210f archive the first, second, third, fourth, fifth, and sixth L1 samples, respectively. In this example embodiment, stage control register component 108 can generate a stage control register for discriminator stage 212 such that discriminator instance 212a is used to reduce the first L1 sample to a first L2 sample and is reused to reduce the second, third, fourth, fifth, and sixth L1 samples to second, third, fourth, fifth, and sixth L2 samples, respectively. In this example embodiment, stage control register component 108 can generate a stage control register for bit stage 214 such that: bit storage element 214*a* archives the first L2 sample; bit storage element 214*b* is used to store the second L2 sample and is reused to store the third L2 sample; and bit storage elements 214*c*, 214*d*, 214*e* archive the fourth, fifth, and sixth L2 samples, respectively. As illustrated in the example embodiment depicted in FIG. 4, each of the first, second, third, fourth, fifth, and sixth L2 samples can be provided via one or more memory slots 216 to an entity as defined herein that can implement quantum state measurement logic system 102.

In the example embodiment illustrated in FIG. 4, by generating the above described stage control registers for each stage in quantum state measurement pipelines 402*a*, 402*b*, 402*c*, 402*d*, 402*e*, 402*f*, quantum state measurement logic system 102 and/or stage control register component 108 can thereby generate such quantum state measurement pipelines 402*a*, 402*b*, 402*c*, 402*d*, 402*e*, 402*f*. Additionally, or alternatively, in this example embodiment, based on such generation of the above described stage control registers for each stage in quantum state measurement pipelines 402*a*, 402*b*, 402*c*, 402*d*, 402*e*, 402*f*, compiler component 110 can generate quantum state measurement logic 404 illustrated in FIG. 4. In some embodiments, compiler component 110 can identify one or more quantum backend computing resources having ability to capture a quantum state measurement based on (e.g., using) quantum state measurement logic 404.

FIG. 5 illustrates a block diagram of an example, non-limiting system 500 that can facilitate quantum state measurement logic used in a quantum state measurement backend process in accordance with one or more embodiments described herein. Repetitive description of like elements and/or processes employed in respective embodiments is omitted for sake of brevity.

System 500 can comprise an example, non-limiting alternative embodiment of system 400 described above with reference to FIG. 4. As illustrated in the example embodiment depicted in FIG. 5, capture array stage 206, kernel stage 208, vector pair value stage 210, discriminator stage 212, and/or bit stage 214 can each comprise multiple instances and/or storage elements that can be used to create multiple quantum state measurement pipelines 502*a*, 502*b*, 502*c*, 502*d*, 502*e*, 502*f*. For instance, in the example embodiment illustrated in FIG. 5: capture array stage 206 can comprise capture array storage elements 206*a*, 206*b*, 206*c*; kernel stage 208 can comprise kernel instances 208*a*, 208*b*, 208*c*; vector pair value stage 210 can comprise vector pair value storage elements 210*a*, 210*b*, 210*c*, 210*d*, 210*e*, 210*f*; discriminator stage 212 can comprise discriminator instances 212*a*, 212*b*, 212*c*; and/or bit stage 214 can comprise bit storage element 214*a*, 214*b*, 214*c*, 214*d*, 214*e*, 214*f*. In this example embodiment, quantum state measurement pipeline 502*a* can comprise the same structure and/or functionality as that of quantum state measurement pipeline 402*a* described above with reference to FIG. 4.

In the example embodiment illustrated in FIG. 5, quantum state measurement pipelines 502*a*, 502*b*, 502*c*, 502*d*, 502*e*, 502*f* can be generated by quantum state measurement logic system 102 using stage control register component 108. For instance, in this example embodiment, stage control register component 108 can generate multiple stage control registers (e.g., 5) that respectively correspond to capture array stage 206, kernel stage 208, vector pair value stage 210, discriminator stage 212, and bit stage 214. In this example embodiment, as described in detail below, stage control register component 108 can generate such stage control registers such that they respectively define a data processing function that corresponds to at least one instance or storage element in each of such stages. For instance, stage control register component 108 can generate such stage control registers such that they respectively define an archive function or a reuse function that corresponds to at least one instance or storage element in each of such stages. In this example, such an archive function can be indicative of preserving a current quantum measurement result and such a reuse function can be indicative of overlaying a current quantum measurement result with a subsequent quantum measurement result. For instance, at the start of an experiment, the first instance or first storage element of each stage can be used by default to process or store quantum state measurement data. In this example embodiment, as each measurement is taken, the bits of each stage control register generated by stage control register component 108 can determine whether to switch to the next instance or storage element in the stage or reuse the current instance or storage element after the measurement is complete (e.g., use the current instance or storage element to process or store subsequent quantum state measurement data captured in a subsequent measurement).

As illustrated in the example embodiment depicted in FIG. 5, stage control register component 108 can generate a stage control register for capture array stage 206 such that: capture array storage element 206*a* is used to store a first L0 sample and is reused to store a second L0 sample; capture array storage element 206*b* archives a third L0 sample; and capture array storage element 206*c* is used to store a fourth L0 sample and is reused to store a fifth L0 sample and a sixth L0 sample. In this example embodiment, stage control register component 108 can generate a stage control register for kernel stage 208 such that: kernel instance 208*a* is used to convert the first L0 sample to a first L1 sample; kernel instance 208*b* is used to convert the second L0 sample to a second L1 sample and is reused to convert the third L0 sample to a third L1 sample; and kernel instance 208*c* is used to convert the fourth L0 sample to a fourth L1 sample and is reused to convert the fifth and sixth L0 samples to a fifth L1 sample and a sixth L1 sample, respectively. In this example embodiment, stage control register component 108 can generate a stage control register for vector pair value stage 210 such that vector pair value storage elements 210*a*, 210*b*, 210*c*, 210*d*, 210*e*, 210*f* archive the first, second, third, fourth, fifth, and sixth L1 samples, respectively. In this example embodiment, stage control register component 108 can generate a stage control register for discriminator stage 212 such that: discriminator instance 212*a* is used to reduce the first L1 sample to a first L2 sample and is reused to reduce the second and third L1 samples to a second L2 sample and a third L2 sample, respectively; and discriminator instance 212*b* is used to reduce the fourth L1 sample to a fourth L2 sample and is reused to reduce the fifth and sixth L1 samples to a fifth L2 sample and a sixth L2 sample, respectively. In this example embodiment, stage control register component 108 can generate a stage control register for bit stage 214 such that: bit storage element 214*a* archives the first L2 sample; bit storage element 214*b* is used to store the second L2 sample and is reused to store the third L2 sample; and bit storage elements 214*c*, 214*d*, 214*e* archive the fourth, fifth, and sixth L2 samples, respectively. As illustrated in the example embodiment depicted in FIG. 5, each of the first, second, third, fourth, fifth, and sixth L2 samples can be provided via one or more memory slots 216 to an entity as defined herein that can implement quantum state measurement logic system 102.

In the example embodiment illustrated in FIG. 5, by generating the above described stage control registers for each stage in quantum state measurement pipelines 502a, 502b, 502c, 502d, 502e, 502f, quantum state measurement logic system 102 and/or stage control register component 108 can thereby generate such quantum state measurement pipelines 502a, 502b, 502c, 502d, 502e, 502f. Additionally, or alternatively, in this example embodiment, based on such generation of the above described stage control registers for each stage in quantum state measurement pipelines 502a, 502b, 502c, 502d, 502e, 502f, compiler component 110 can generate quantum state measurement logic 504 illustrated in FIG. 5. In some embodiments, compiler component 110 can identify one or more quantum backend computing resources having ability to capture a quantum state measurement based on (e.g., using) quantum state measurement logic 504.

Figure 6:
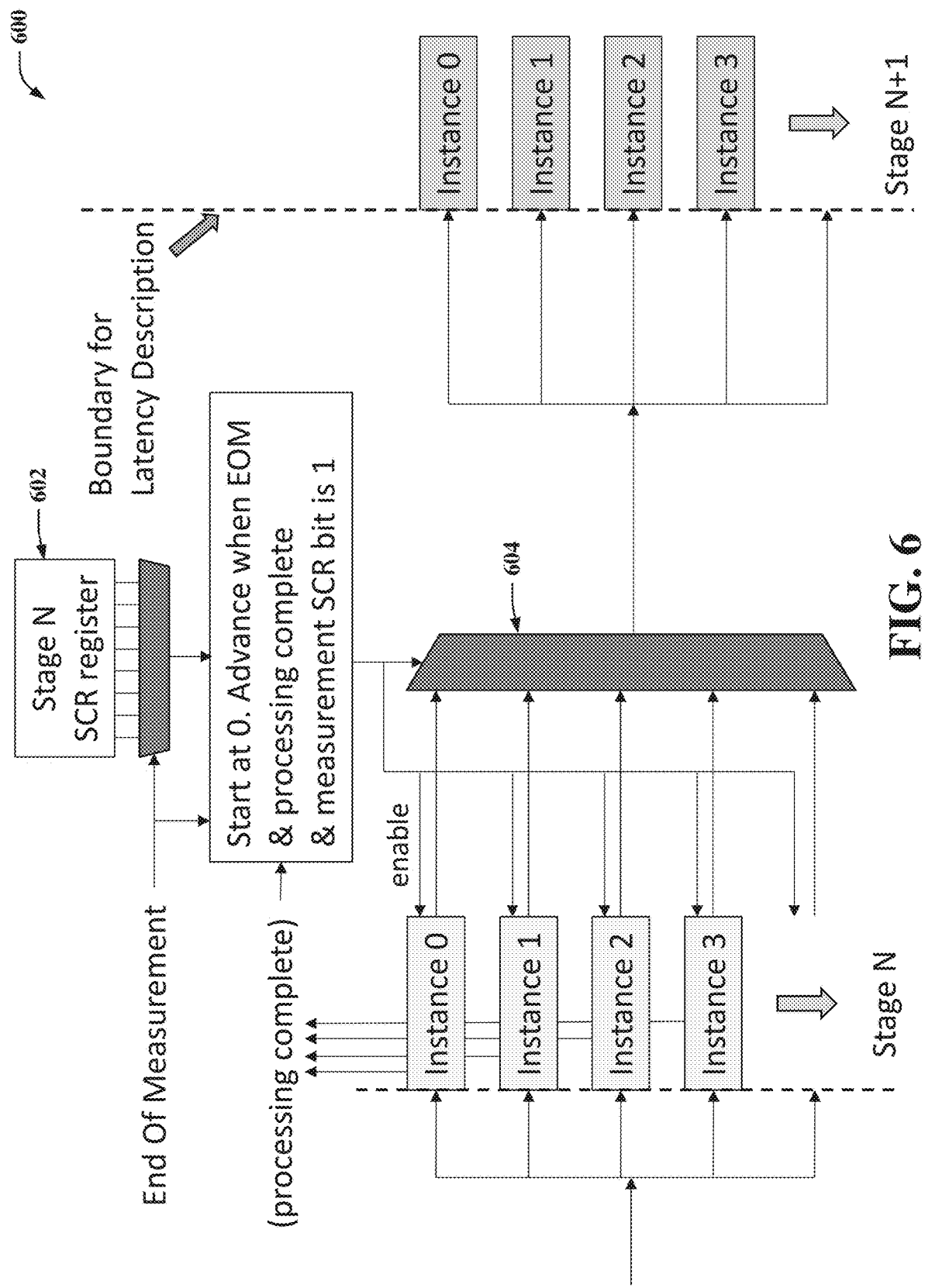

FIG. 6 illustrates a block diagram of an example, non-limiting system 600 that can facilitate quantum state measurement logic used in a quantum state measurement backend process in accordance with one or more embodiments described herein. Repetitive description of like elements and/or processes employed in respective embodiments is omitted for sake of brevity.

System 600 shown in the example embodiment depicted in FIG. 6 illustrates the logic from a conceptual standpoint that can exist between any two of the above described stages of quantum state measurement pipelines 402a, 402b, 402c, 402d, 402e, 402f and/or quantum state measurement pipelines 502a, 502b, 502c, 502d, 502e, 502f, where such two stages are denoted as "Stage N" and "Stage N+1" in FIG. 6. In the example embodiments described above with reference to FIGS. 4 and 5, by dynamically changing stage instances and/or storage elements using the above described stage control registers that can be generated by stage control register component 108, it should be appreciated that quantum state measurement logic system 102, system 400, and/or system 500 can effectively use a selection mechanism between stages to change which instance and/or storage element is active and use it as the input into the next stage. In the example embodiment depicted in FIG. 6, system 600 can represent such a selection mechanism. In the example embodiment depicted in FIG. 6, system 600 illustrates how the above described selection mechanism and stage control registers operate and precisely defines the boundaries used to describe latencies through each pipeline described above (e.g., quantum state measurement pipelines 402a, 402b, 402c, 402d, 402e, 402f and quantum state measurement pipelines 502a, 502b, 502c, 502d, 502e, 502f).

As described in detail below, bits of each stage control register described above that can be generated by stage control register component 108 are used to control the above described selection mechanism represented as system 600 in the example embodiment depicted in FIG. 6. As described above with reference to the example embodiments depicted in FIGS. 2, 4, and 5, instance 0 and/or storage element 0 of each stage and bit 0 of the corresponding stage control register generated by stage control register component 108 can be set as the active entities at the start of each experiment. In these example embodiments and in the example embodiment illustrated in FIG. 6, as end of measurement (EOM) indications are received by system 600, a different bit can be selected from a stage control register 602 corresponding to a certain stage (denoted as "Stage N SCR Register" in FIG. 6), where stage control register 602 can be generated by stage control register component 108 as described above. In these example embodiments, the selected bit, the EOM, and knowledge of when the active instance and/or active storage element has completed processing the current measurement are used (e.g., by quantum state measurement logic system 102, stage control register component 108, compiler component 110, system 600, stage control register 602, and/or a selection multiplexer 604 of system 600) to determine whether or not to change the active instance and/or active storage element to the next one in line. In these embodiments, it should be noted that changing the active instance and/or active storage element also changes which one serves as the source of the input of the next stage.

The example embodiment depicted in FIG. 6 also shows where the boundaries exist to describe latency through the above described pipeline stages. For instance, in this example embodiment, such boundaries for latency description are defined to be at the start of each stage instance. In this example embodiment, using this definition, delay through the selection mechanism represented as system 600 in FIG. 6 can be included with the latency of the driving stage instance rather than be part of the next stage latency. In this example embodiment, such a convention works well since the first stage (e.g., capture array stage 206) latency description starts after filtering is complete, and the last stage output (e.g., an L2 sample from an active bit storage element 214a, 214b, 214c, 214d, 214e, or 214f) ends after selection multiplexer 604 illustrated in FIG. 6.

Quantum state measurement logic system 102 can be associated with various technologies. For example, quantum state measurement logic system 102 can be associated with quantum computing technologies, quantum hardware and/or software technologies, quantum algorithm technologies, quantum simulation technologies, quantum operator sampling technologies, quantum backend computing technologies, quantum state measurement backend technologies, machine learning technologies, artificial intelligence technologies, cloud computing technologies, and/or other technologies.

Quantum state measurement logic system 102 can provide technical improvements to systems, devices, components, operational steps, and/or processing steps associated with the various technologies identified above. For example, quantum state measurement logic system 102 can: define a data processing function corresponding to at least one storage element in at least one stage of a quantum state measurement pipeline. In this example, quantum state measurement logic system 102 can further: define the data processing function based on one or more entity defined criteria corresponding to the quantum state measurement pipeline; and define data processing functions corresponding to storage elements in the at least one stage of the quantum state measurement pipeline to enable a defined quantity of quantum backend computing resources to capture a quantum state measurement based on quantum state measurement logic comprising the data processing functions.

In the above examples, by defining one or more data processing functions based on one or more entity defined criteria, quantum state measurement logic system 102 can improve a quantum state measurement backend system and/or process by enabling a compiler associated with such a system and/or process to more quickly and more efficiently identify a greater quantity of quantum backend computing resources that can capture a quantum state measurement, as such resources only have to support such one or more entity defined criteria. For instance, in embodiments where an entity as defined herein that implements quantum state measurement logic system 102 only wants to archive the L0 samples described above, compiler component 110 can more quickly and/or more efficiently identify a greater quantity of quantum backend computing resources that can capture a quantum state measurement, as such resources only have to be able to facilitate such archiving of only the L0 samples (e.g., as opposed to being able to facilitate archiving of the L0, L1, and L2 samples described above). In another example, in embodiments where such an entity wants to use a certain kernel instance or a certain discriminator instance, compiler component 110 can more quickly and/or more efficiently identify a greater quantity of quantum backend computing resources that can support such a certain kernel instance or such a certain discriminator instance (e.g., as opposed to being able to support various types of kernel instances or various types of discriminator instances).

Quantum state measurement logic system 102 can provide technical improvements to a processing unit (e.g., processor 106, etc.) associated with quantum state measurement logic system 102. For example, by enabling the above described compiler (e.g., compiler component 110) to more quickly and/or more efficiently identify a greater quantity of quantum backend computing resources that only have to support one or more specific entity defined criteria, quantum state measurement logic system 102 can thereby reduce the number of processing cycles that are performed by a processing unit (e.g., processor 106) in executing software (e.g., instructions, commands, processing threads, etc.) of such a compiler when performing the above described resource identification process. In this example, by reducing the number of processing cycles that are performed by such a processing unit (e.g., processor 106), quantum state measurement logic system 102 can thereby facilitate improved performance, improved efficiency, and/or reduced computational costs associated with such a processing unit (e.g., processor 106).

A practical application of quantum state measurement logic system 102 is that it can be implemented in a quantum state measurement backend system and/or process to capture quantum state measurements from one or more qubits that can be used to compute one or more solutions (e.g., heuristic(s), etc.) to a variety of problems ranging in complexity (e.g., an estimation problem, an optimization problem, etc.) in a variety of domains (e.g., finance, chemistry, medicine, etc.). For example, a practical application of quantum state measurement logic system 102 is that it can be implemented in a quantum state measurement backend system and/or process to capture quantum state measurements from one or more qubits that can be used to compute one or more solutions (e.g., heuristic(s), etc.) to an optimization problem in the domain of chemistry, medicine, and/or finance, where such a solution can be used to engineer, for instance, a new chemical compound, a new medication, and/or a new option premium.

It should be appreciated that quantum state measurement logic system 102 provides a new approach driven by relatively new quantum computing technologies. For example, quantum state measurement logic system 102 provides a new approach to identify a greater quantity of quantum backend computing resources that can capture quantum state measurement data based on one or more specific entity defined criteria.

Quantum state measurement logic system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Quantum state measurement logic system 102 and/or components thereof, can be employed to solve new problems that arise through advancements in technologies mentioned above, employment of quantum computing systems, cloud computing systems, computer architecture, and/or another technology.

It is to be appreciated that quantum state measurement logic system 102 can utilize various combinations of electrical components, mechanical components, and circuitry that cannot be replicated in the mind of a human or performed by a human, as the various operations that can be executed by quantum state measurement logic system 102 and/or components thereof as described herein are operations that are greater than the capability of a human mind. For instance, the amount of data processed, the speed of processing such data, or the types of data processed by quantum state measurement logic system 102 over a certain period of time can be greater, faster, or different than the amount, speed, or data type that can be processed by a human mind over the same period of time.

According to several embodiments, quantum state measurement logic system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that quantum state measurement logic system 102 can include information that is impossible to obtain manually by an entity, such as a human user. For example, the type, amount, and/or variety of information included in quantum state measurement logic system 102, stage control register component 108, and/or compiler component 110 can be more complex than information obtained manually by a human user.

Figure 7:
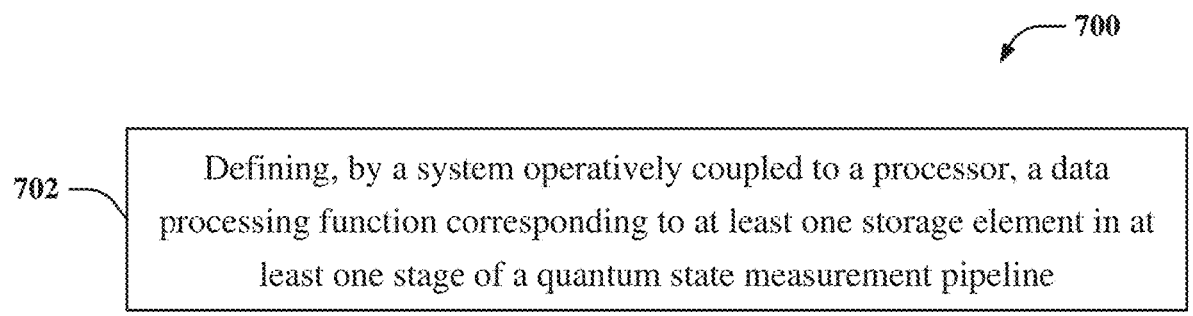
FIGS. 7, 8, and 9 illustrate flow diagrams of example, non-limiting computer-implemented methods that can facilitate quantum state measurement logic used in a quantum state measurement backend process in accordance with one or more embodiments described herein.

FIG. 7 illustrates a flow diagram of an example, non-limiting computer-implemented method 700 that can facilitate quantum state measurement logic used in a quantum state measurement backend process in accordance with one or more embodiments described herein. Repetitive description of like elements and/or processes employed in respective embodiments is omitted for sake of brevity.

At 702, computer-implemented method 700 can comprise defining, by a system (e.g., via quantum state measurement logic system 102 and/or stage control register component 108) operatively coupled to a processor (e.g., processor 106, a quantum processor, etc.), a data processing function (e.g., an archive function or a reuse function) corresponding to at least one storage element in at least one stage (e.g., capture array stage 206, kernel stage 208, vector pair value stage 210, discriminator stage 212, bit stage 214, etc.) of a quantum state measurement pipeline (e.g., quantum state measurement pipelines 402a, 402b, 402c, 402d, 402e, 402f and/or quantum state measurement pipelines 502a, 502b, 502c, 502d, 502e, 502f). As described above with reference to the example embodiments illustrated in FIGS. 2, 4, and 5, such at least one storage element can include, but is not limited to, at least one of: capture array storage elements 206a, 206b, 206c; vector pair value storage elements 210a, 210b, 210c, 210d, 210e, 210f; and/or bit storage elements 214a, 214b, 214c, 214d, 214e, 214f. In some embodiments, at 702, computer-implemented method 700 can further comprise defining, by the system (e.g., via quantum state measurement logic system 102 and/or stage control register component 108), the data processing function (e.g., an archive function or a reuse function) corresponding to at least one instance in the at least one stage of the quantum state measurement pipeline, where such at least one instance can include, but is not limited to, at least one of: kernel instances, 208a, 208b, 208c; and/or discriminator instances 212a, 212b, 212c.

Figure 8:
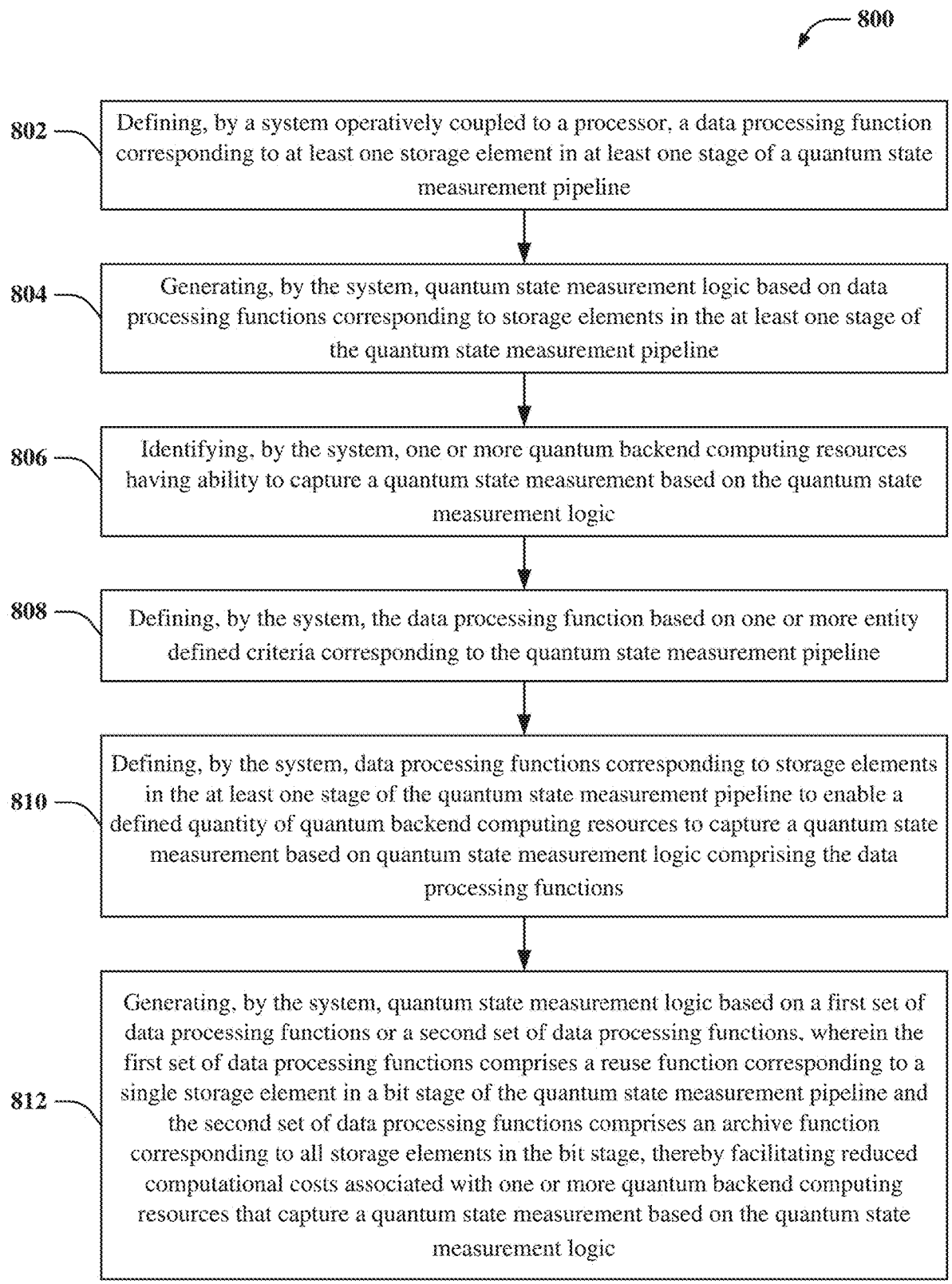

FIG. 8 illustrates a flow diagram of an example, non-limiting computer-implemented method 800 that can facilitate quantum state measurement logic used in a quantum state measurement backend process in accordance with one or more embodiments described herein. Repetitive description of like elements and/or processes employed in respective embodiments is omitted for sake of brevity.

At 802, computer-implemented method 800 can comprise defining, by a system (e.g., via quantum state measurement logic system 102 and/or stage control register component 108) operatively coupled to a processor (e.g., processor 106, a quantum processor, etc.), a data processing function (e.g., an archive function or a reuse function) corresponding to at least one storage element in at least one stage (e.g., capture array stage 206, kernel stage 208, vector pair value stage 210, discriminator stage 212, bit stage 214, etc.) of a quantum state measurement pipeline (e.g., quantum state measurement pipelines 402a, 402b, 402c, 402d, 402e, 402f and/or quantum state measurement pipelines 502a, 502b, 502c, 502d, 502e, 502f). As described above with reference to the example embodiments illustrated in FIGS. 2, 4, and 5, such at least one storage element can include, but is not limited to, at least one of: capture array storage elements 206a, 206b, 206c; vector pair value storage elements 210a, 210b, 210c, 210d, 210e, 210f; and/or bit storage elements 214a, 214b, 214c, 214d, 214e, 214f. In some embodiments, at 802, computer-implemented method 800 can further comprise defining, by the system (e.g., via quantum state measurement logic system 102 and/or stage control register component 108), the data processing function (e.g., an archive function or a reuse function) corresponding to at least one instance in the at least one stage of the quantum state measurement pipeline, where such at least one instance can include, but is not limited to, at least one of: kernel instances, 208a, 208b, 208c; and/or discriminator instances 212a, 212b, 212c.

At 804, computer-implemented method 800 can comprise generating, by the system (e.g., via quantum state measurement logic system 102 and/or compiler component 110), quantum state measurement logic (e.g., quantum state measurement logic 404 or quantum state measurement logic 504) based on data processing functions corresponding to storage elements in the at least one stage of the quantum state measurement pipeline.

At 806, computer-implemented method 800 can comprise identifying, by the system (e.g., via quantum state measurement logic system 102 and/or compiler component 110), one or more quantum backend computing resources (e.g., quantum based software, quantum hardware, quantum processor, superconducting circuit, quantum computer, etc.) having ability to capture a quantum state measurement based on the quantum state measurement logic.

At 808, computer-implemented method 800 can comprise defining, by the system (e.g., via quantum state measurement logic system 102 and/or stage control register component 108), the data processing function based on one or more entity defined criteria (e.g., the one or more entity defined criteria described above with reference to FIG. 1) corresponding to the quantum state measurement pipeline.

At 810, computer-implemented method 800 can comprise defining, by the system (e.g., via quantum state measurement logic system 102 and/or stage control register component 108), data processing functions corresponding to storage elements in the at least one stage of the quantum state measurement pipeline to enable a defined quantity (e.g., a greater quantity as described above with reference to FIG. 1) of quantum backend computing resources to capture a quantum state measurement based on quantum state measurement logic (e.g., quantum state measurement logic 404 or quantum state measurement logic 504) comprising the data processing functions.

At 812, computer-implemented method 800 can comprise generating, by the system (e.g., via quantum state measurement logic system 102 and/or stage control register component 108), quantum state measurement logic (e.g., quantum state measurement logic 404 or quantum state measurement logic 504) based on a first set of data processing functions or a second set of data processing functions, wherein the first set of data processing functions comprises a reuse function corresponding to a single storage element (e.g., bit storage element 214a, 214b, 214c, 214d, 214e, or 214f) in a bit stage (e.g., bit stage 214) of the quantum state measurement pipeline and the second set of data processing functions comprises an archive function corresponding to all storage elements (e.g., bit storage element 214a, 214b, 214c, 214d, 214e, and 214f) in the bit stage, thereby facilitating reduced computational costs associated with one or more quantum backend computing resources that capture a quantum state measurement based on the quantum state measurement logic.

In an embodiment, operation 812 of computer-implemented method 800 described above can constitute collapsing a stage control register that can be generated by stage control register component 108 into a single bit that selects "always reuse" or "always advance" (e.g., "always archive"). It should be appreciated that such collapsing of a stage control register at operation 812 as described above can facilitate preservation of and/or reduced computational costs of one or more quantum backend computing resources that capture a quantum state measurement based on such first or second set of data processing functions defined above. For instance, as defined, bit stage 214 uses one (1) stage control register bit per data bit and that becomes wasteful as the number of measurements grows. In this example, referencing a single stage control register bit for the control of all storage elements in bit stage 214 can be more efficient when individual measurement control is not requested by an entity as defined herein that implements quantum state measurement logic system 102.

Figure 9:
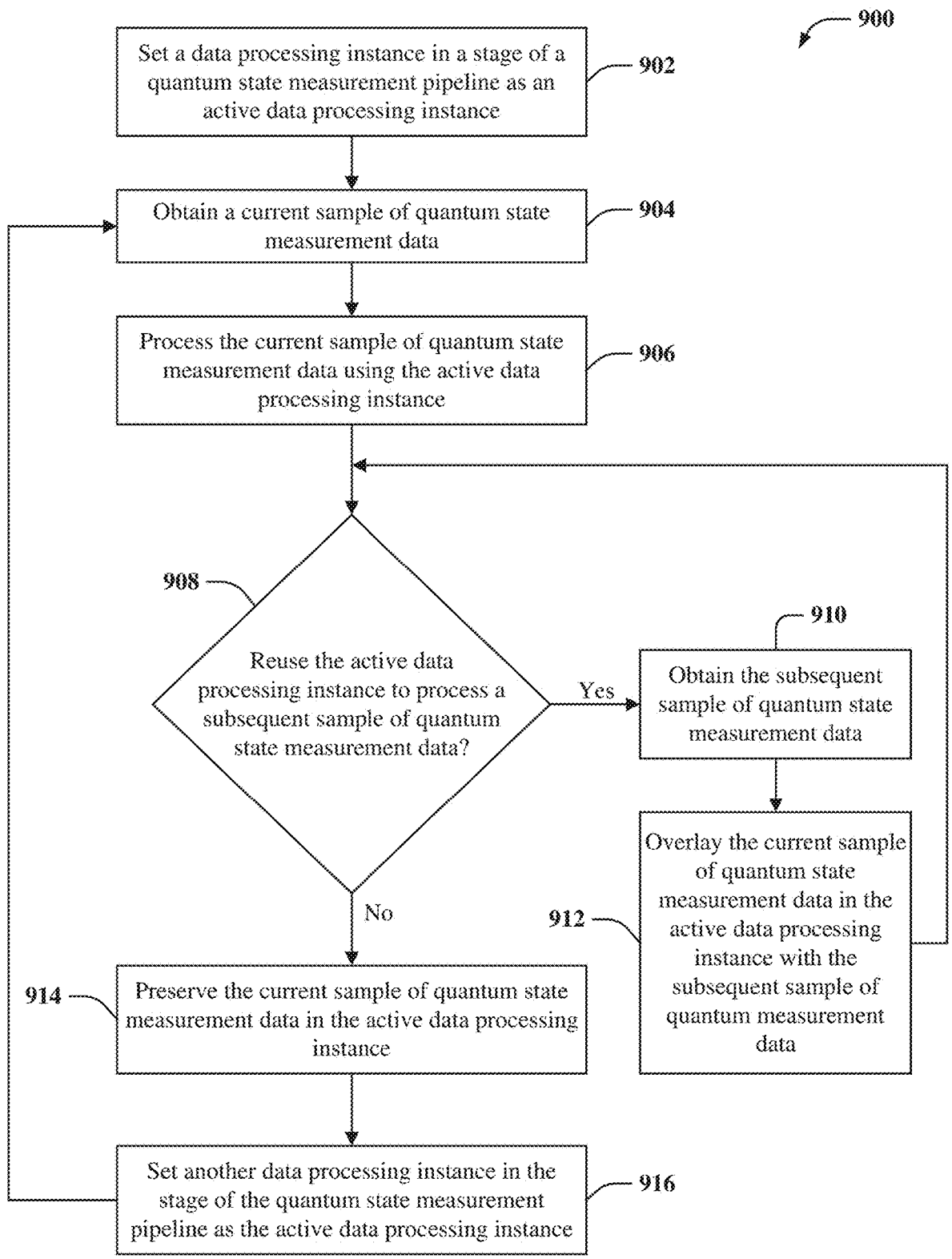

FIG. 9 illustrates a flow diagram of an example, non-limiting computer-implemented method 900 that can facilitate quantum state measurement logic used in a quantum state measurement backend process in accordance with one or more embodiments described herein. Repetitive description of like elements and/or processes employed in respective embodiments is omitted for sake of brevity.

At 902, computer-implemented method 900 can comprise setting (e.g., via quantum state measurement logic system 102, stage control register component 108, compiler component 110, system 600, stage control register 602 (e.g., a stage control register generated by stage control register component 108), and/or selection multiplexer 604) a data processing instance (e.g., capture array storage element 206a, 206b, 206c, kernel instance 208a, 208b, 208c, vector pair value storage element 210a, 210b, 210c, 210d, 210e, 210f, discriminator instance 212a, 212b, 212c, bit storage element 214a, 214b, 214c, 214d, 214e, 214f, etc.) in a stage (e.g., capture array stage 206, kernel stage 208, vector pair value stage 210, discriminator stage 212, bit stage 214, etc.) of a quantum state measurement pipeline (e.g., quantum state measurement pipelines 402a, 402b, 402c, 402d, 402e, 402f, quantum state measurement pipelines 502a, 502b, 502c, 502d, 502e, 502f, etc.) as an active data processing instance (e.g., as the data processing instance that will process a current sample of quantum state measurement data (e.g., a first L0, L1, or L2 sample)).

At 904, computer-implemented method 900 can comprise obtaining (e.g., via quantum state measurement logic system 102, a GUI or an API of quantum state measurement logic system 102, filter 204, system 200, system 400, system 500, system 600, etc.) a current sample of quantum state measurement data (e.g., a first L0, L1, or L2 sample).

At 906, computer-implemented method 900 can comprise processing (e.g., via quantum state measurement logic system 102, capture array storage element 206a, 206b, 206c, kernel instance 208a, 208b, 208c, vector pair value storage element 210a, 210b, 210c, 210d, 210e, 210f, discriminator instance 212a, 212b, 212c, bit storage element 214a, 214b, 214c, 214d, 214e, 214f, etc.) the current sample of quantum state measurement data using the active data processing instance.

At 908, computer-implemented method 900 can comprise determining (e.g., via quantum state measurement logic system 102, stage control register component 108, compiler component 110, system 600, stage control register 602 (e.g., a stage control register generated by stage control register component 108), and/or selection multiplexer 604) whether to reuse the active data processing instance to process a subsequent sample of quantum state measurement data (e.g., a second L0, L1, or L2 sample).

If it is determined at 908 that the active data processing instance will be reused to process a subsequent sample of quantum state measurement data (e.g., a second L0, L1, or L2 sample), at 910, computer-implemented method 900 can comprise obtaining (e.g., via quantum state measurement logic system 102, a GUI or an API of quantum state measurement logic system 102, filter 204, system 200, system 400, system 500, system 600, etc.) the subsequent sample of quantum state measurement data.

At 912, computer-implemented method 900 can comprise overlaying (e.g., via quantum state measurement logic system 102, capture array storage element 206a, 206b, 206c, kernel instance 208a, 208b, 208c, vector pair value storage element 210a, 210b, 210c, 210d, 210e, 210f, discriminator instance 212a, 212b, 212c, bit storage element 214a, 214b, 214c, 214d, 214e, 214f, etc.) the current sample of quantum state measurement data in the active data processing instance with the subsequent sample of quantum measurement data.

If it is determined at 908 that the active data processing instance will not be reused to process a subsequent sample of quantum state measurement data (e.g., a second L0, L1, or L2 sample), at 914, computer-implemented method 900 can comprise preserving (e.g., archiving via quantum state measurement logic system 102, capture array storage element 206a, 206b, 206c, kernel instance 208a, 208b, 208c, vector pair value storage element 210a, 210b, 210c, 210d, 210e, 210f, discriminator instance 212a, 212b, 212c, bit storage element 214a, 214b, 214c, 214d, 214e, 214f, etc.) the current sample of quantum state measurement data in the active data processing instance.

At 916, computer-implemented method 900 can comprise setting (e.g., via quantum state measurement logic system 102, stage control register component 108, compiler component 110, system 600, stage control register 602 (e.g., a stage control register generated by stage control register component 108), and/or selection multiplexer 604) another data processing instance (e.g., the next data processing instance in line) in the stage of the quantum state measurement pipeline as the active data processing instance (e.g., setting capture array storage element 206b or 206c, kernel instance 208b or 208c, vector pair value storage element 210b, 210c, 210d, 210e, or 210f, discriminator instance 212b or 212c, and/or bit storage element 214b, 214c, 214d, 214e, or 214f as the active data processing instance).

In some embodiments, computer-implemented method 900 can comprise repeating operations 904, 906, 908, 910, and 912 and/or operations 904, 906, 908, 914, and 916 can be repeated until all quantum state measurements of one or more qubits have been captured by one or more quantum backend computing resources.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
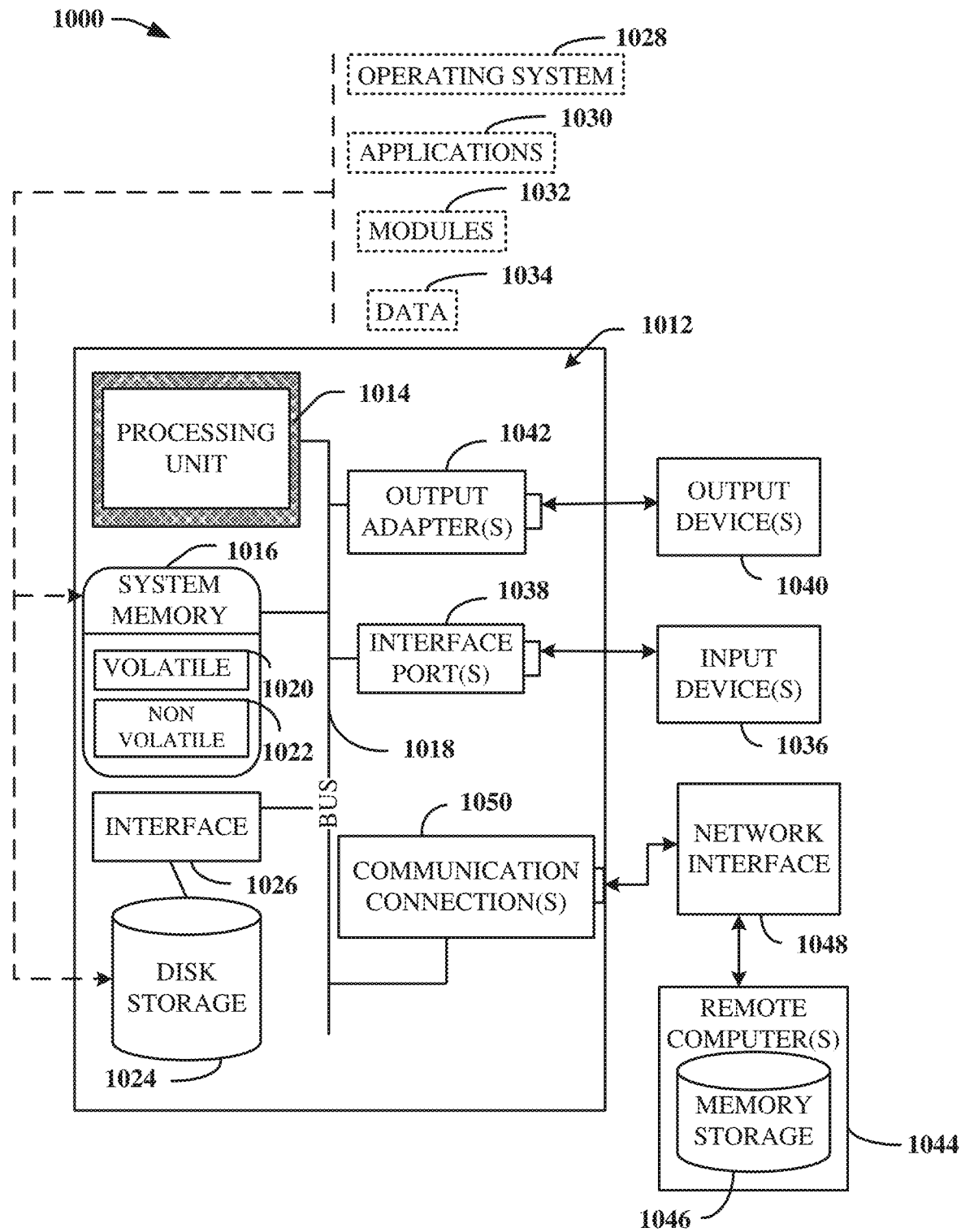
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
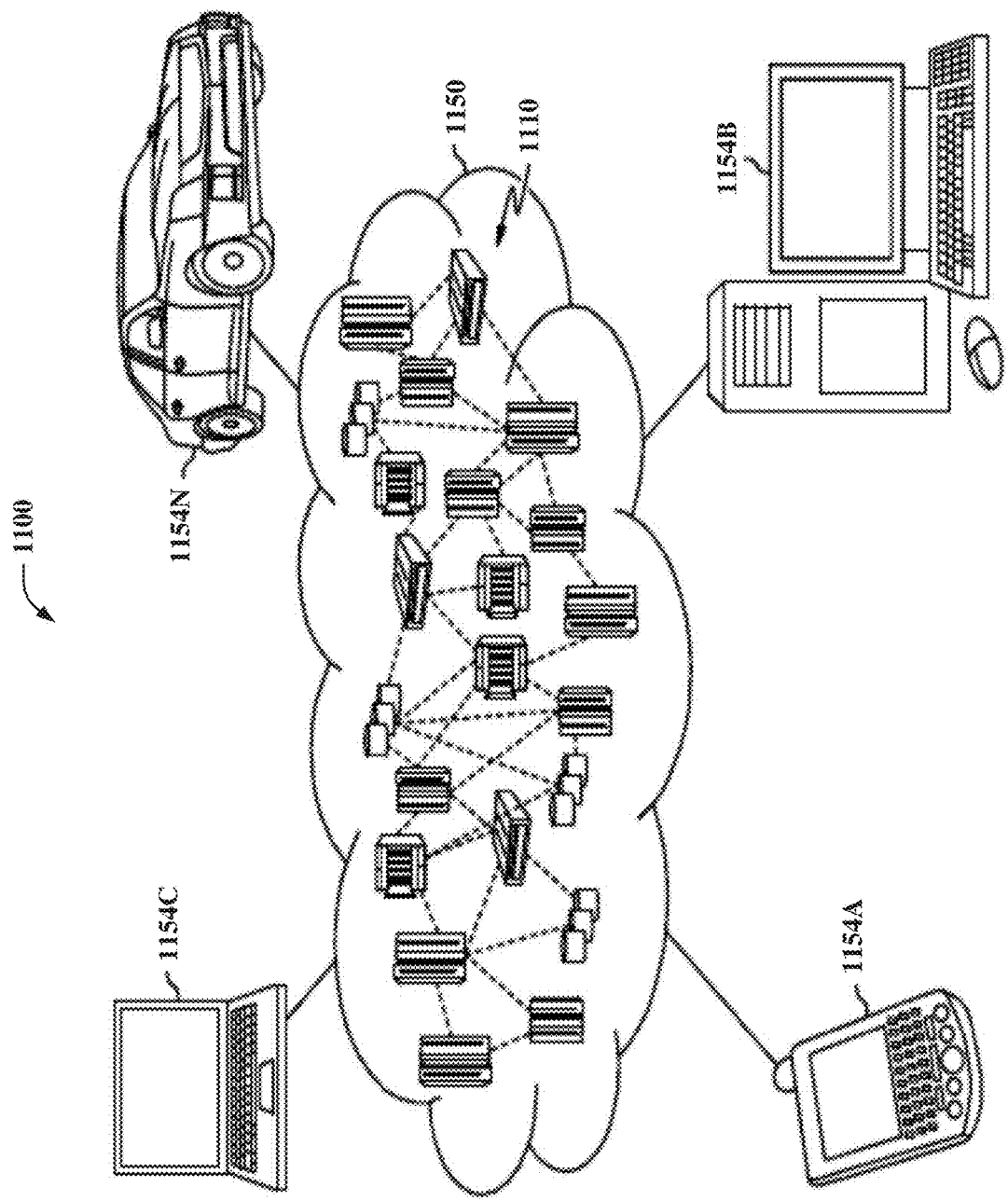
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Although not illustrated in FIG. 11, cloud computing nodes 1110 can further comprise a quantum platform (e.g., quantum computer, quantum hardware, quantum software, etc.) with which local computing devices used by cloud consumers can communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
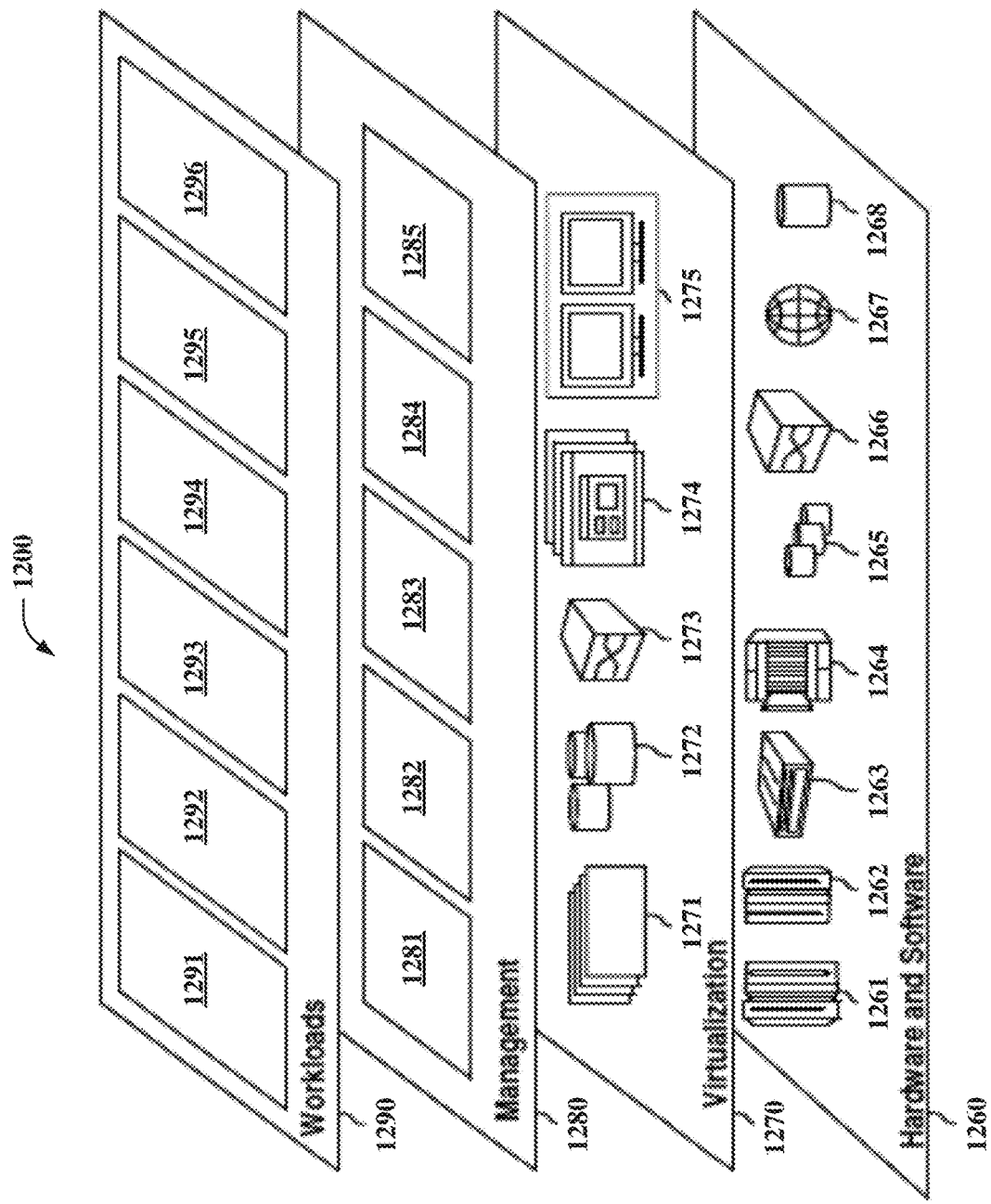
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267, database software 1268, quantum platform routing software (not illustrated in FIG. 12), and/or quantum software (not illustrated in FIG. 12).

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and quantum state measurement logic software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a stage control register component that defines a data processing function corresponding to at least one storage element in at least one stage of a quantum state measurement pipeline and initiates a defined quantity of quantum backend computing resources to capture a quantum state measurement based on quantum state measurement logic comprising the data processing functions.

2. The system of claim 1, wherein the data processing function comprises an archive function that preserves a current quantum measurement result.

3. The system of claim 1, wherein the data processing function comprises a reuse function that overlays a current quantum measurement result with a subsequent quantum measurement result.

4. The system of claim 1, wherein the at least one stage is selected from a group consisting of a capture array stage, a kernel stage, a vector pair value stage, a discriminator stage, and a bit stage.

5. The system of claim 1, wherein the computer executable components further comprise:
a compiler component that generates quantum state measurement logic based on data processing functions corresponding to storage elements in the at least one stage of the quantum state measurement pipeline, and wherein the compiler component identifies one or more quantum backend computing resources having ability to capture a quantum state measurement based on the quantum state measurement logic.

6. The system of claim 1, wherein the stage control register component defines the data processing function based on one or more entity defined criteria corresponding to the quantum state measurement pipeline.

7. The system of claim 1, wherein the computer executable components further comprise:
a compiler component that generates quantum state measurement logic based on a first set of data processing functions or a second set of data processing functions and that captures the quantum state measurement, and wherein the first set of data processing functions comprises a reuse function corresponding to a single storage element in a bit stage of the quantum state measurement pipeline and the second set of data processing functions comprises an archive function corresponding to all storage elements in the bit stage, thereby facilitating reduced computational costs associated with one or more quantum backend computing resources that capture a quantum state measurement based on the quantum state measurement logic.

8. A computer-implemented method, comprising:
defining, by a system operatively coupled to a processor, a data processing function corresponding to at least one storage element in at least one stage of a quantum state measurement pipeline; and
defining, by the system, data processing functions corresponding to storage elements in the at least one stage of the quantum state measurement pipeline and initiating a defined quantity of quantum backend computing resources to capture a quantum state measurement based on quantum state measurement logic comprising the data processing functions.

9. The computer-implemented method of claim 8, wherein the data processing function comprises an archive function indicative of preserving a current quantum measurement result.

10. The computer-implemented method of claim 8, wherein the data processing function comprises a reuse function indicative of overlaying a current quantum measurement result with a subsequent quantum measurement result.

11. The computer-implemented method of claim 8, wherein the at least one stage is selected from a group consisting of a capture array stage, a kernel stage, a vector pair value stage, a discriminator stage, and a bit stage.

12. The computer-implemented method of claim 8, further comprising:
generating, by the system, quantum state measurement logic based on data processing functions corresponding to storage elements in the at least one stage of the quantum state measurement pipeline; and identifying, by the system, one or more quantum backend computing resources having ability to capture a quantum state measurement based on the quantum state measurement logic.

13. The computer-implemented method of claim 8, further comprising:

defining, by the system, the data processing function based on one or more entity defined criteria corresponding to the quantum state measurement pipeline.

14. The computer-implemented method of claim 8, further comprising:

generating, by the system, quantum state measurement logic based on a first set of data processing functions or a second set of data processing functions, wherein the first set of data processing functions comprises a reuse function corresponding to a single storage element in a bit stage of the quantum state measurement pipeline and the second set of data processing functions comprises an archive function corresponding to all storage elements in the bit stage, thereby facilitating reduced computational costs associated with one or more quantum backend computing resources that capture a quantum state measurement based on the quantum state measurement logic.

15. A computer program product facilitating a quantum state measurement backend process, the computer program product comprising a computer readable storage medium having program instructions embodied therewith, the program instructions executable by a processor to cause the processor to:

define, by the processor, a data processing function corresponding to at least one storage element in at least one stage of a quantum state measurement pipeline; and define, by the processor, data processing functions corresponding to storage elements in the at least one stage of the quantum state measurement pipeline and enabling initiating a defined quantity of quantum backend computing resources to capture a quantum state measurement based on quantum state measurement logic comprising the data processing functions.

16. The computer program product of claim 15, wherein the data processing function comprises an archive function indicative of preserving a current quantum measurement result.

17. The computer program product of claim 15, wherein the data processing function comprises a reuse function indicative of overlaying a current quantum measurement result with a subsequent quantum measurement result.

18. The computer program product of claim 15, wherein the at least one stage is selected from a group consisting of a capture array stage, a kernel stage, a vector pair value stage, a discriminator stage, and a bit stage.

19. The computer program product of claim 15, wherein the program instructions are further executable by the processor to cause the processor to:

generate, by the processor, quantum state measurement logic based on data processing functions corresponding to storage elements in the at least one stage of the quantum state measurement pipeline; and identify, by the processor, one or more quantum backend computing resources having ability to capture a quantum state measurement based on the quantum state measurement logic.

20. The computer program product of claim 15, wherein the program instructions are further executable by the processor to cause the processor to:

generate, by the processor, quantum state measurement logic based on a first set of data processing functions or a second set of data processing functions, and wherein the first set of data processing functions comprises a reuse function corresponding to a single storage element in a bit stage of the quantum state measurement pipeline and the second set of data processing functions comprises an archive function corresponding to all storage elements in the bit stage, thereby facilitating reduced computational costs associated with one or more quantum backend computing resources that capture a quantum state measurement based on the quantum state measurement logic.

* * * * *